(12) United States Patent
Watanabe et al.

(10) Patent No.: US 11,941,322 B2
(45) Date of Patent: Mar. 26, 2024

(54) DISPLAY CONTROL DEVICE FOR SELECTING ITEM ON BASIS OF SPEECH

(71) Applicant: Saturn Licensing LLC, New York, NY (US)

(72) Inventors: Takuo Watanabe, Tokyo (JP); Nobuhiro Ozu, Tokyo (JP); Tsuyoshi Yamada, Tokyo (JP); Shunichi Sugiura, Kanagawa (JP); Naoki Saito, Chiba (JP)

(73) Assignee: Saturn Licensing LLC, New York, NY (US)

( * ) Notice: Subject to any disclaimer, the term of this patent is extended or adjusted under 35 U.S.C. 154(b) by 354 days.

(21) Appl. No.: 17/416,249

(22) PCT Filed: Dec. 13, 2019

(86) PCT No.: PCT/JP2019/048897
§ 371 (c)(1),
(2) Date: Jun. 18, 2021

(87) PCT Pub. No.: WO2020/137607
PCT Pub. Date: Jul. 2, 2020

(65) Prior Publication Data
US 2022/0057989 A1 Feb. 24, 2022

(30) Foreign Application Priority Data
Dec. 27, 2018 (JP) .................................. 2018-244221

(51) Int. Cl.
*G06F 3/16* (2006.01)
*H04N 21/422* (2011.01)
*H04N 21/485* (2011.01)

(52) U.S. Cl.
CPC ....... *G06F 3/167* (2013.01); *H04N 21/42203* (2013.01); *H04N 21/4852* (2013.01); *H04N 21/4854* (2013.01)

(58) Field of Classification Search
CPC ...... G06F 3/167; G06F 3/0485; G06F 3/0482; G06F 3/048; H04N 21/485;
(Continued)

(56) References Cited

U.S. PATENT DOCUMENTS

2014/0168130 A1   6/2014   Hirai
2015/0189362 A1*  7/2015   Lee .......................... G06F 3/167
                                                        725/38
(Continued)

FOREIGN PATENT DOCUMENTS

EP   3561653 A1     10/2019
JP   2007087104 A    4/2007
(Continued)

OTHER PUBLICATIONS

International Search Report for Application No. PCT/JP2019/048897, dated Feb. 25, 2020, 3 pages.

*Primary Examiner* — Yogeshkumar Patel
(74) *Attorney, Agent, or Firm* — Jeffery Brosemer

(57) ABSTRACT

Provided is a display control device including: a voice receiver configured to receive a voice utterance from a user; a communication unit configured to receive information for the voice utterance from a server via a network; and a controller configured to select an item corresponding to the voice utterance on the basis of the information that has been received, and configured to control an action in response to the item that has been selected, in which the item includes a first item in an inside of a display screen and a second item that becomes displayable by scrolling, and the controller selects either the first item or the second item on the basis of (Continued)

the information that has been received. The present technology is applicable to, for example, a television receiver.

22 Claims, 29 Drawing Sheets

(58) Field of Classification Search
CPC ......... H04N 21/42203; H04N 21/4852; H04N 21/4854; H04N 21/233; H04N 21/42204; H04N 21/482; H04N 21/431; H04N 21/4312; H04N 21/4316; H04N 21/4394; G09G 5/00; G09G 5/34; G09G 5/36; G10L 15/00; G10L 15/22; G10L 15/28; G10L 15/30; G10L 15/26

See application file for complete search history.

(56) References Cited

U.S. PATENT DOCUMENTS

| 2015/0382047 | A1* | 12/2015 | Van Os | H04N 21/482 |
| | | | | 725/38 |
| 2019/0147881 | A1* | 5/2019 | Igarashi | H04N 21/4622 |
| | | | | 704/251 |

FOREIGN PATENT DOCUMENTS

| JP | 2014153663 A | 8/2014 |
| JP | 2016508271 A | 3/2016 |
| JP | 2018022049 A | 2/2018 |
| JP | 2019144759 A | 8/2019 |
| WO | 2013015364 A1 | 1/2013 |
| WO | WO2014107186 A1 | 7/2014 |
| WO | 2018116556 A1 | 6/2018 |

* cited by examiner

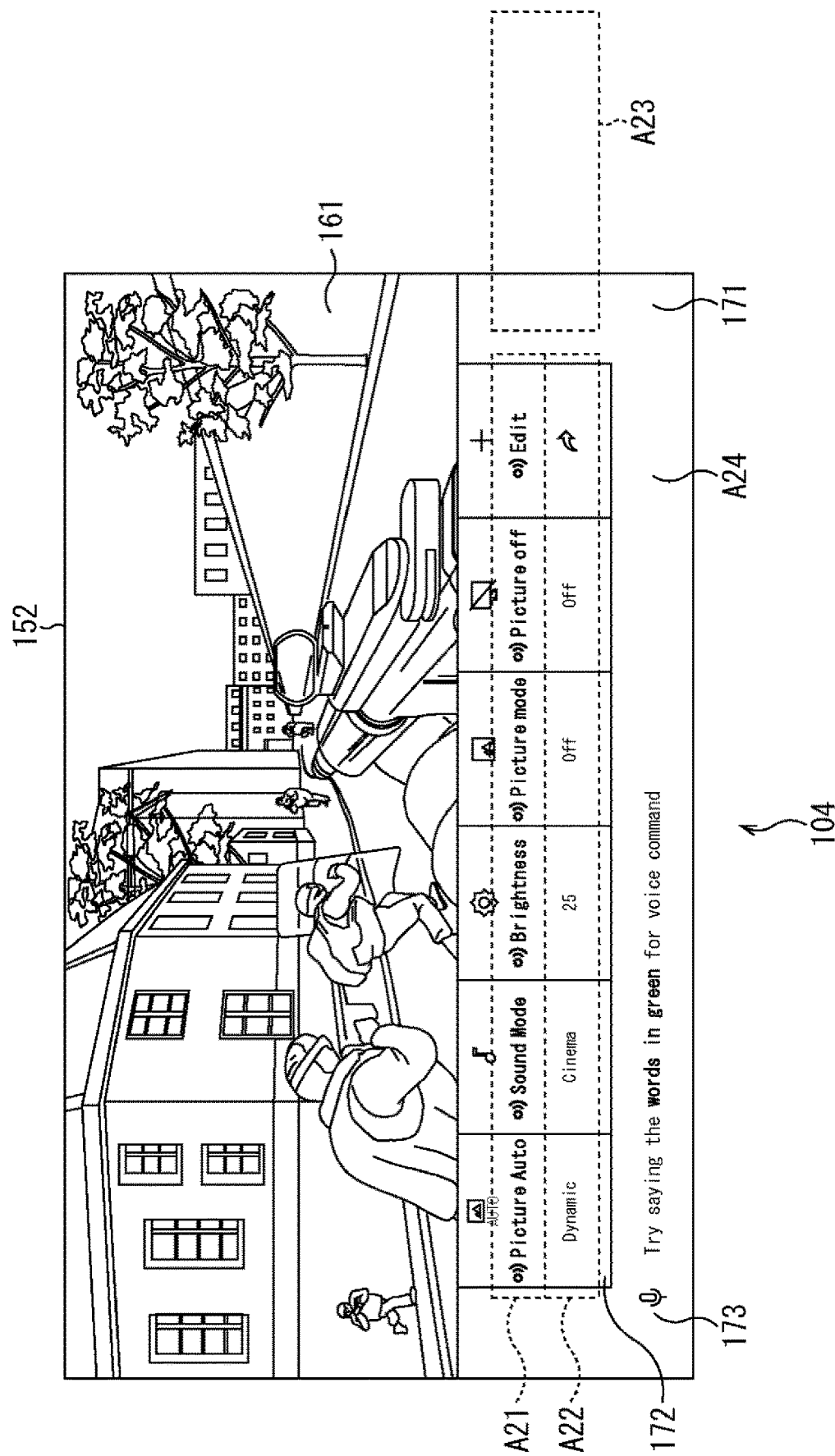

FIG. 15

| AREA | DESCRIPTION |
|---|---|
| A21 | RECOMMENDED READ ALOUD ITEM IS DISPLAYED WITH ICON AND GREEN CHARACTER. |
| A22 | ITEM OTHER THAN RECOMMENDED READ ALOUD ITEM CAN BE ALSO READ ALOUD. BEHAVIOR IS TREATED SUCH THAT AREA A21 HAS BEEN READ ALOUD. |
| A23 | ITEM IN OUTSIDE OF DISPLAY SCREEN CAN BE ALSO READ ALOUD. |
| A24 | COMMANDS FOR SCREEN OPERATIONS SUCH AS "CLOSE" AND "NEXT" OR "FORWARD" FOR SCROLL CAN BE ALSO READ ALOUD. SCROLL IS TREATED AS PAGE SCROLL INSTEAD OF UNIT OF ITEM. |

FIG. 16

| | PROBLEMS | SOLUTIONS |
|---|---|---|
| 1 | CASE WHERE PLURALITY OF TYPES OF SAME WORDING IS PRESENT IN INSIDE OF DISPLAY SCREEN (SUCH AS "ON") | ITEM CLOSE TO UPPER LEFT ON DISPLAY SCREEN IS GIVEN PRIORITY. (UPPER RIGHT IS REFERENCE IN RTL LANGUAGE). |
| 2 | CASE WHERE WORDING DISPLAYED IN INSIDE OF DISPLAY SCREEN IS LONG (SUCH AS PROGRAM NAME OF TELEVISION PROGRAM) | PARTIAL MATCHING IS ALLOWED IN MATCHING OF WORDING. |
| 3 | CASE WHERE WORDING IS SO SHORT THAT CLAUSE DIVISION CANNOT BE AUTOMATICALLY DETERMINED (SUCH AS "ON") | READING ONLY IN SMART VOICE MODE IS PRESENTED, SUCH AS "TURN ON". |
| 4 | CASE WHERE VOICE UTTERANCE CANNOT BE CONVERTED CORRECTLY DUE TO SPECIFICATION ON VOICE UTTERANCE TEXT CONVERSION SIDE | TYPES OF WORDING THAT CANNOT BE CONVERTED CORRECTLY ARE EXTRACTED BEFOREHAND TO CREATE INTERNAL CONVERSION TABLE TO ABSORB ERRONEOUS CONVERSION. IN ADDITION, BY REFERRING TO SUCH INTERNAL CONVERSION TABLE AT TIME OF DECIDING VOICE UTTERANCE INSTEAD OF AT TIME OF DECIDING COMMAND, IT IS POSSIBLE TO REFLECT ON UTTERANCE DECISION FEEDBACK. |

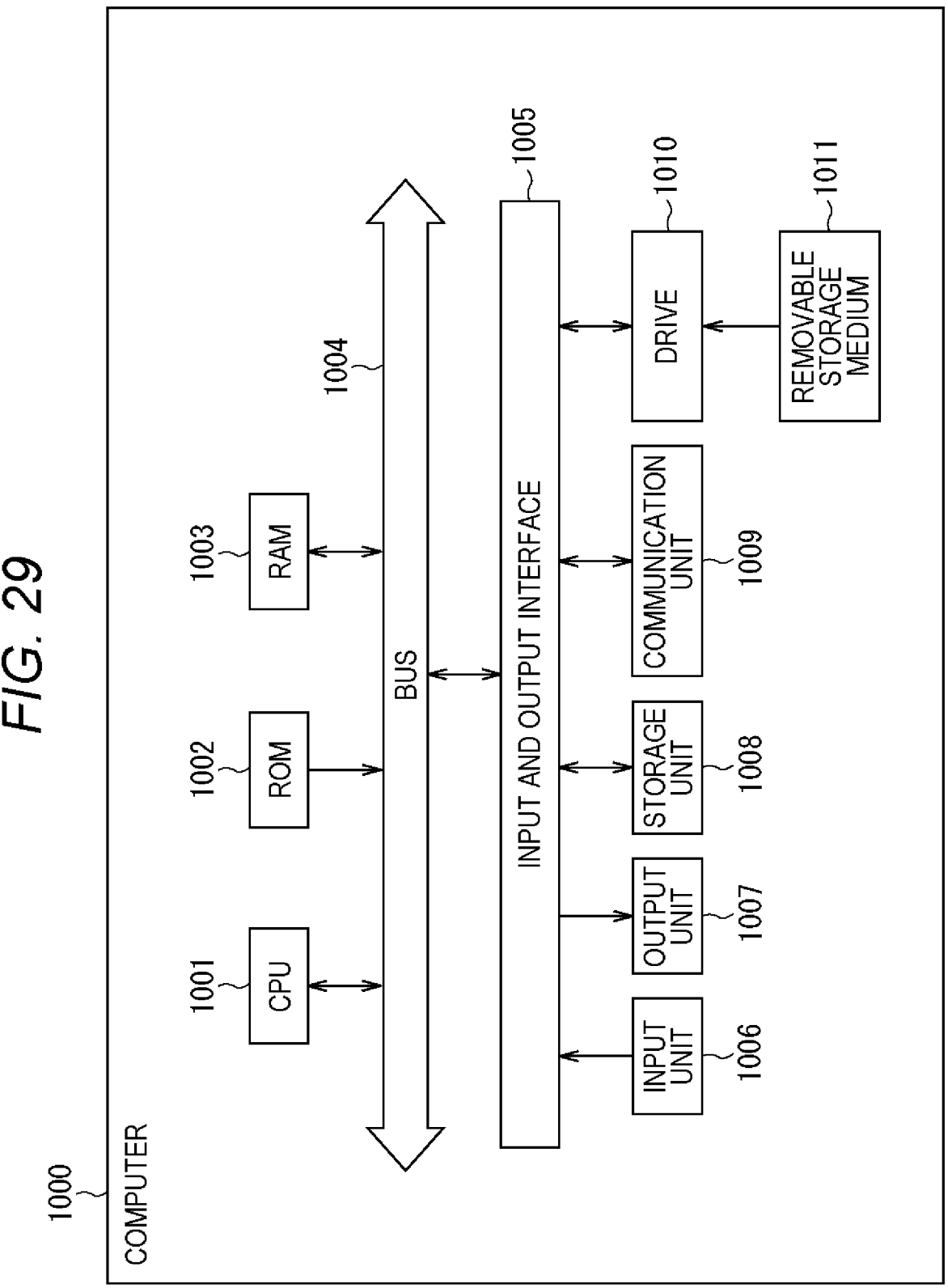

DISPLAY CONTROL DEVICE FOR SELECTING ITEM ON BASIS OF SPEECH

CROSS-REFERENCE TO RELATED APPLICATIONS

This application is a national phase entry under 35 U.S.C. § 371 of International Application No. PCT/JP2019/048897 filed Dec. 13, 2019, which claims the priority from Japanese Patent Application No. 2018-244221 filed in the Japanese Patent Office on Dec. 27, 2018, the entire contents of which are hereby incorporated by reference.

TECHNICAL FIELD

The present technology relates to display control devices and display control methods, and more particularly to a display control device and a display control method enabling voice operations to be performed with higher usability.

BACKGROUND ART

These years, as display control devices such as television receivers or the like, devices capable of supporting a voice operation in response to a voice utterance made by a user are in widespread use (see, for example, Patent Document 1).

CITATION LIST

Patent Document

Patent Document 1: Japanese Patent Application Laid-Open No. 2014-153663

SUMMARY OF THE INVENTION

Problems to be Solved by the Invention

For the display control devices such as the television receivers, by the way, in supporting the voice operations, the voice operations to be performed with high usability are demanded.

The present technology has been made in view of such circumstances, and enables the voice operations to be performed with higher usability.

Solutions to Problems

A display control device according to one aspect of the present technology is a display control device including: a voice receiver configured to receive a voice utterance from a user; a communication unit configured to receive information for the voice utterance from a first server via a network; and a controller configured to select an item corresponding to the voice utterance on the basis of the information that has been received, and configured to control an action in response to the item that has been selected, in which the item includes a first item in an inside of a display screen and a second item that becomes displayable by scrolling, and the controller selects either the first item or the second item on the basis of the information that has been received.

A display control method according to one aspect of the present technology is a display control method corresponding to the display control device according to one aspect of the present technology described above.

In the display control device according to one aspect of the present technology and the display control method, a voice utterance from a user is received, information for the voice utterance is received from a server via a network, and either a first item in an inside of a display screen or a second item that becomes displayable by scrolling is selected as an item corresponding to the voice utterance on the basis of the information that has been received, and an action in response to either the first item or the second item that has been selected is controlled.

A display control device according to one aspect of the present technology is a display control device including: a voice receiver configured to receive a voice utterance from a user; a communication unit configured to receive information for the voice utterance from a server via a network; and a controller configured to select an item corresponding to the voice utterance on the basis of the information that has been received, and configured to control an action in response to the item that has been selected, in which the item includes a first item in an inside of a display screen and a second item that becomes displayable by reducing a size of the item, and the controller selects either the first item or the second item on the basis of the information that has been received.

In the display control device according to one aspect of the present technology, a voice utterance is received from a user, information for the voice utterance is received from a server via a network, and either a first item in an inside of a display screen or a second item that becomes displayable by reducing a size of the item is selected as an item corresponding to the voice utterance on the basis of the information that has been received, and an action in response to either the first item or the second item that has been selected is controlled.

A display control device according to one aspect of the present technology is a display control device including: a voice receiver configured to receive a voice utterance from a user; a communication unit configured to receive information for the voice utterance from a server via a network; and a controller configured to select an item corresponding to the voice utterance on the basis of the information that has been received, and configured to control an action in response to the item that has been selected, in which the item includes a first item in an inside of a display screen and a second item that becomes displayable by enlarging an area in which the item is displayed, and the controller selects either the first item or the second item on the basis of the information that has been received.

In the display control device according to one aspect of the present technology, a voice utterance is received from a user, information for the voice utterance is received from a server via a network, and either a first item in an inside of a display screen or a second item that becomes displayable by enlarging an area in which the item is displayed is selected as an item corresponding to the voice utterance on the basis of the information that has been received, and an action in response to either the first item or the second item that has been selected is controlled.

A display control device according to one aspect of the present technology may be an independent device, or may be an internal block constituting a single device.

BRIEF DESCRIPTION OF DRAWINGS

FIG. 14 is a diagram showing an example of an item display area in the quick setting menu.

FIG. 15 is a diagram showing a description of each area of FIG. 14.

FIG. 16 is a diagram showing problems and solutions when items included in an item display area are read aloud.

FIG. 29 is a diagram showing a configuration example of a computer.

MODE FOR CARRYING OUT THE INVENTION

Hereinafter, embodiments of the present technology will be described with reference to the drawings. It is to be noted that the description will be given in the following order.

1. Embodiment of the present technology
2. Modification example
3. Computer configuration 1. Embodiment of the Present Technology (System Configuration)

Figure 1:
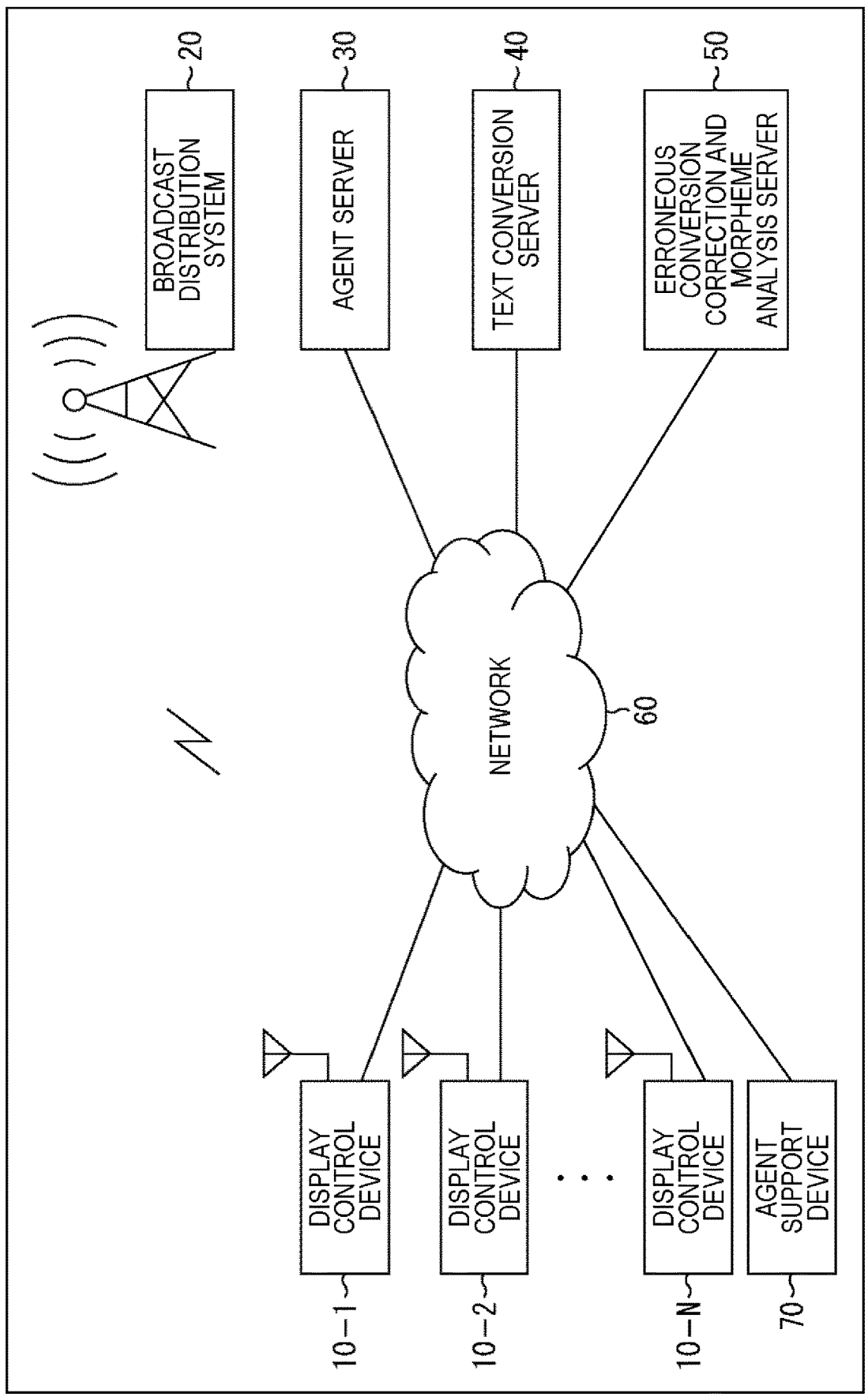
FIG. 1 is a diagram showing a configuration example of a broadcast communication system including a display control device to which the present technology is applied.

FIG. 1 is a diagram showing a configuration example of a broadcast communication system including a display control device to which the present technology is applied.

The broadcast communication system shown in FIG. 1 includes display control devices 10-1 to 10-N (N is an integer of 1 or more), a broadcast distribution system 20, an agent server 30, a text conversion server 40, and an erroneous conversion correction and morpheme analysis server 50.

Further, in the broadcast communication system, the respective display control devices 10-1 to 10-N are connected with the agent server 30, the text conversion server 40, and the erroneous conversion correction and morpheme analysis server 50 via a network 60 including the Internet.

The display control device 10-1 is, for example, a television receiver configured as a liquid crystal display device, an organic light emitting diode (OLED) display device, or the like. The display control device 10-1 receives and processes broadcast signals transmitted from the broadcast distribution system 20, displays a video of a broadcast content such as a television program, and in addition, outputs sounds in synchronization with the video.

Further, in addition to an operation of a remote controller by a user (hereinafter, also referred to as a remote control operation), the display control device 10-1 also supports an operation in response to voices (a voice utterance) uttered by the user (hereinafter, also referred to as a voice operation). The display control device 10-1 conducts various actions in response to the remote control operation or the voice operation. It is to be noted that the display control device 10-1 performs various processes in cooperation with the agent server 30, the text conversion server 40, and the erroneous conversion correction and morpheme analysis server 50 via the network 60 in order to perform the voice operation by the user.

The display control devices 10-2 to 10-N are configured in a similar manner to the display control device 10-1, so as to allow users to view/listen to broadcast contents, and in addition, support both the remote control operation and the voice operation. It is to be noted that in the following description, in a case where it is not necessary to distinguish the display control devices 10-1 to 10-N in particular, simply the display control device 10 will be used for description. In addition, the detailed configuration of the display control device 10 will be described later with reference to FIG. 2.

It is to be noted that the display control device 10 is capable of utilizing a voice artificial intelligence (AI) assistant service to perform the voice operation. Further, the display control device 10 is capable of cooperating with an agent support device 70 via the network 60. For example, the display control device 10 and the agent support device 70 are installed in the same building such as a user's house, so that various types of data can be exchanged via a home network such as a wireless local area network (LAN).

The agent support device 70 is, for example, a device such as a smart speaker or a smartphone, and is capable of using a voice AI assistant service via the network 60. It is to be noted that the voice AI assistant service is a service that understands the intention of a voice utterance made by the user and that provides an appropriate output in response to the content. Further, the smart speaker is a speaker having an AI assistant function that supports an interactive voice operation.

The broadcast distribution system 20 includes one or a plurality of broadcast servers, or the like. The broadcast distribution system 20 performs a necessary process on a broadcast content such as a television program to be distributed, and transmits a broadcast signal (a broadcast wave) obtained as a result, from a transmission antenna installed at a transmission station.

The agent server 30 is a server that understands the content and intention of a voice utterance from the user, collects or acquires appropriate information and commands, and includes one or a plurality of servers. The agent server 30 has functions such as, for example, a text conversion function and a command conversion function.

The text conversion server 40 is a server that converts a voice signal in response to the voice utterance made by the user into text data, and includes one or a plurality of servers. The text conversion server 40 has a function such as, for example, a text conversion function.

The erroneous conversion correction and morpheme analysis server 50 is a server that prevents an erroneous conversion and that provides correct information in converting the voice signal in response to the voice utterance made by the user into text data, and includes one or a plurality of servers. The erroneous conversion correction and morpheme analysis server 50 has functions such as, for example, an erroneous conversion correction function and a morpheme analysis function.

It is to be noted that the agent server 30, the text conversion server 40, and the erroneous conversion correction and morpheme analysis server 50 perform various processes in cooperation with the respective display control devices 10-1 to 10-N via the network 60. The detailed configuration will be described later with reference to FIG. 3.

(Configuration of Display Control Device)

Figure 2:
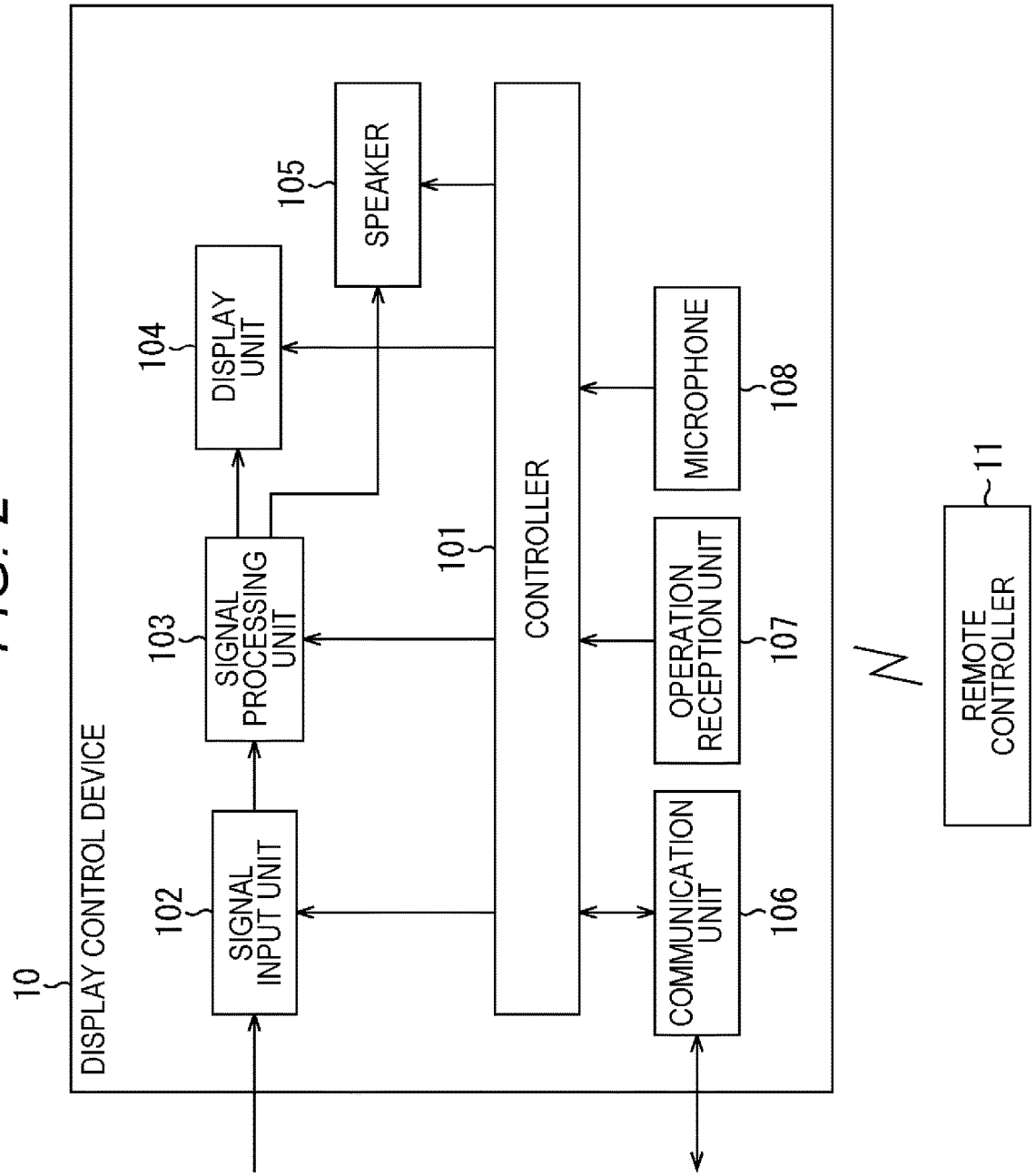
FIG. 2 is a block diagram showing a configuration example of the display control device of FIG. 1.

FIG. 2 is a block diagram showing an example of a configuration of the display control device 10 of FIG. 1.

In FIG. 2, the display control device 10 includes a controller 101, a signal input unit 102, a signal processing unit 103, a display unit 104, a speaker 105, a communication unit 106, an operation reception unit 107, and a microphone 108.

The controller 101 includes, for example, a central processing unit (CPU), a microcomputer, or the like. The controller 101 is a central control device (a processing device) that controls actions of the respective units and that performs various arithmetic processes, and controls the actions of the respective units of the display control device 10.

The signal input unit 102 includes, for example, a tuner or the like. In a case where the signal input unit 102 is configured as a tuner, the signal input unit 102 performs a process such as a demodulation process on the broadcast signal that has been received via the antenna, and supplies the signal processing unit 103 with the signal obtained as a result.

The broadcast signal here is, for example, a signal transmitted from the broadcast distribution system 20 (a signal in compliance with terrestrial broadcasting), and a signal of a broadcast content is transmitted. Here, not only the terrestrial broadcasting but also, for example, a broadcast signal in compliance with a predetermined broadcasting system such as satellite broadcasting or cable television broadcasting may be input.

It is to be noted that the signal input unit 102 may be configured as an interface in compliance with a predetermined standard such as, for example, high definition multimedia interface (HDMI) (registered trademark), universal serial bus (USB), or the like, so that the signals of a recorded content that has been recorded by a recording device or a network storage or a stored content that has been stored on a storage medium such as a semiconductor memory or an optical disk may be input into the signal processing unit 103. It is to be noted that the recorded content may be recorded by a television receiver and stored in a storage.

The signal processing unit 103 includes, for example, a system-on-chip or the like. The signal processing unit 103 performs a process such as decoding on the signal supplied from the signal input unit 102, supplies the display unit 104 with a video signal obtained as a result, and also supplies the speaker 105 with an audio signal.

The display unit 104 includes, for example, a liquid crystal display unit, an OLED display unit, or the like. The display unit 104 processes the video signal supplied from the signal processing unit 103 according to the control from the controller 101 to display the video of the broadcast content (for example, a television program or the like) or the video of various screens (for example, a menu screen or the like).

For example, in a case where the display control device 10 is a liquid crystal display device, the display unit 104 serving as the liquid crystal display unit is a display panel in which pixels including liquid crystal elements and thin film transistor (TFT) elements are arranged in a two-dimensional arrangement, and conducts displaying by modulating light emitted from backlight (not shown) according to driving from the controller 101. Further, for example, in a case where the display control device 10 is an OLED display device, the display unit 104 serving as the OLED display unit is a display panel in which pixels including self-luminous elements are arranged in a two-dimensional arrangement, and conducts displaying according to driving from the controller 101.

The speaker 105 processes the audio signal supplied from the signal processing unit 103 according to the control from the controller 101, and outputs the audio of the broadcast content (for example, a television program or the like).

The communication unit 106 includes a communication module or the like that supports, for example, wireless communication such as a wireless LAN or cellular communication (for example, LTE-Advanced, the Fifth Generation (5G), or the like). The communication unit 106 exchanges various types of data with various servers via the network 60 according to the control from the controller 101.

It is to be noted that the communication unit 106 may receive streaming data of a communication content (a net content) distributed from a content distribution server, and may input the streaming data into the signal processing unit 103 according to the control from the controller 101. Consequently, the video of the communication content such as a moving image is displayed on the display unit 104, and sounds in synchronization with the video are output from the speaker 105.

The operation reception unit 107 includes, for example, a short-range wireless communication module, an infrared light receiving module, or the like. The operation reception unit 107 receives a signal (receives light) such as a wireless signal or an infrared signal transmitted from a remote controller 11, and supplies the controller 101 with the signal as an operation signal. The controller 101 controls the actions of the respective units on the basis of a command corresponding to an operation signal supplied from the operation reception unit 107.

It is to be noted that as short-range wireless communication here, for example, communication in compliance with the Bluetooth (registered trademark) standard can be performed. In addition, although not shown, the remote controller 11 is provided with, for example, buttons such as a power button, an input switching button, a cross button, a volume adjustment button, a channel selection button, and a microphone activation button. Further, a microphone may be built in the main body of the remote controller 11.

The microphone 108 converts an external sound (a voice) into an electric signal, and supplies the controller 101 with a voice signal obtained as a result. In other words, when the user makes a voice utterance (utters a voice), the microphone 108 can be said as a voice receiver configured to receive the voice utterance.

That is, when the user makes a voice utterance (utters a voice), the microphone 108 collects the voice utterance, and supplies the controller 101 with the voice signal. The controller 101 controls the actions of the respective units so that the voice operation in response to the voice utterance is performed on the basis of the voice signal supplied from the microphone 108.

(Example of Voice Operation Process)

Figure 3:
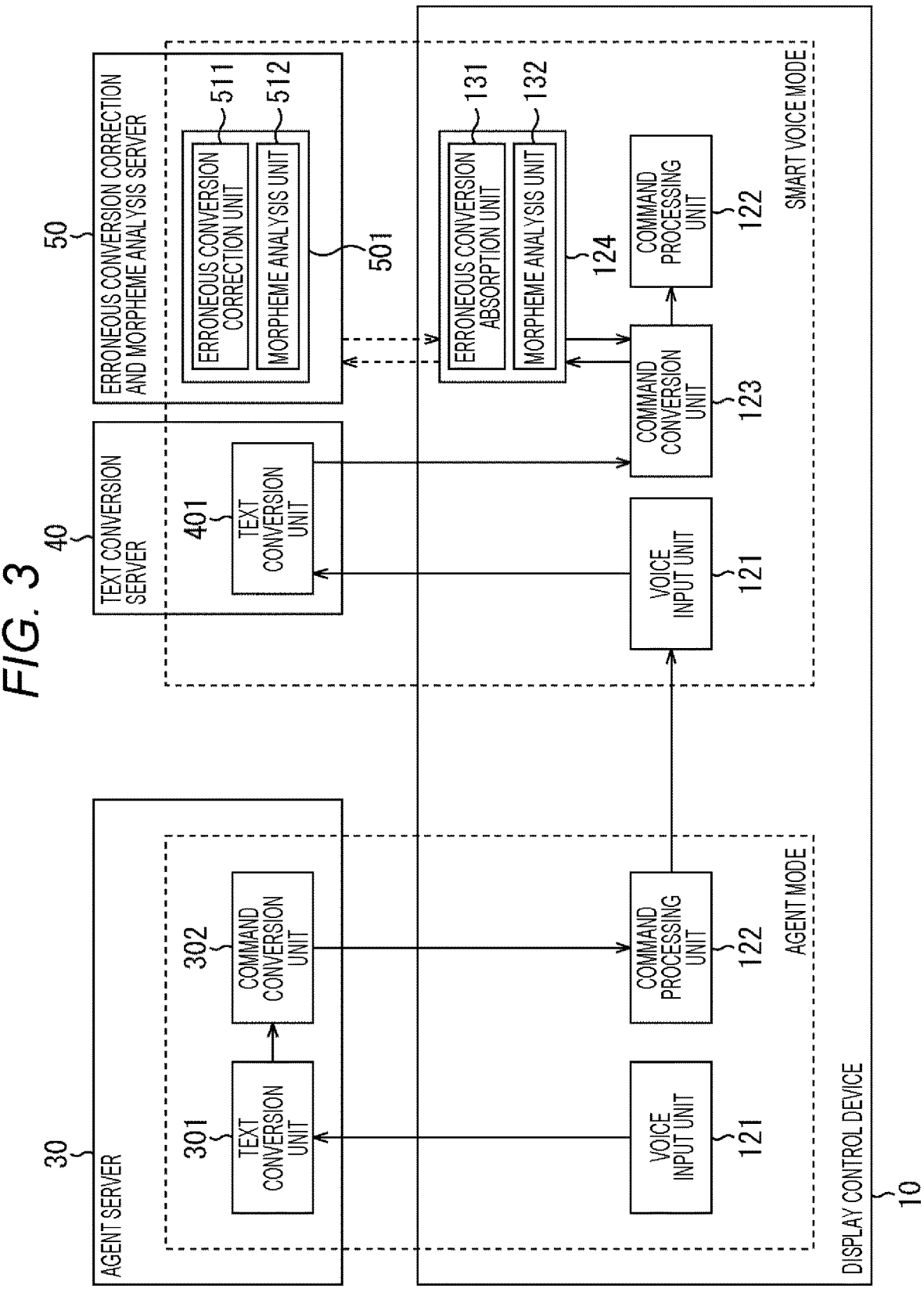
FIG. 3 is a block diagram showing a flow of a voice operation process.

FIG. 3 is a block diagram showing a flow of a voice operation process performed by the display control device 10 in response to a voice utterance.

As described above, there is a method for utilizing the voice AI assistant service that is externally provided, as one of the methods for performing the voice operation, in the display control device 10 such as a television receiver.

It is to be noted that in the voice AI assistant service, in order to enable the service, a wake word (an activation keyword) that is a predetermined keyword is commonly used.

In the present disclosure, a case where a keyword "Service XXX" is used as the wake word will be described as an example. In addition, the voice AI assistant service is activated in some cases by pushing the microphone activation button on the remote controller 11.

In FIG. 3, the agent server 30 and the text conversion server 40 are each supplied, for example, as a platform of the voice AI assistant service that is externally provided. Further, the erroneous conversion correction and morpheme analysis server 50 is supplied by, for example, a manufacturer or the like that designs and manufactures the display control device 10.

In the display control device 10, when a voice utterance is made by the user, the microphone 108 collects such a voice utterance, and inputs the voice signal into a voice input unit 121. Then, the communication unit 106 transmits the voice signal that has been input to the agent server 30 via the network 60.

The agent server 30 receives the voice signal transmitted from the display control device 10, and inputs the voice signal into a text conversion unit 301. The text conversion unit 301 appropriately refers to, for example, a database or the like for voice-to-text conversion, converts the voice signal that has been received into text data, and supplies a command conversion unit 302 with the text data.

The command conversion unit 302 appropriately refers to, for example, a database or the like for command conversion, and converts the text data supplied from the text conversion unit 301 into a command. Then, in the agent server 30, the command that has been converted is transmitted to the display control device 10 via the network 60.

The display control device 10 receives the command transmitted from the agent server 30, and inputs the command into a command processing unit 122. The command processing unit 122 processes the command that has been received, so that an action in response to the voice utterance made by the user is conducted.

In this manner, the display control device 10 operates in an agent mode as an action mode, and utilizes the platform of the voice AI assistant service that is externally provided, so as to perform the voice operation in response to the voice utterance made by the user.

Here, in the display control device 10, the action mode transitions to a smart voice mode, when a specific voice utterance is made by a user. That is, in the display control device 10, in a case of operating in the smart voice mode and when the user makes a voice utterance, a voice signal in response to the voice utterance is input into the voice input unit 121, and the voice signal that has been input is transmitted to the text conversion server 40 via the network 60.

It is to be noted that as a method for transitioning the action mode to the smart voice mode, for example, in addition to the case where the above-described specific voice utterance is made, the following cases are assumed. That is, there is a case where when the agent support device 70 that is externally provided recognizes a specific voice utterance made by the user, the recognition result is received by the display control device 10, and there is another case where a smart voice transition button on the display screen is operated by remote control while the display control device 10 is acting in a remote control operation mode as the action mode.

Further, the action mode of the display control device 10 includes, for example, the agent mode, the smart voice mode, and the remote control operation mode. The agent mode is a mode in which the voice operation is performed utilizing the voice AI assistant service that is externally provided. The smart voice mode is a mode in which the voice operation is performed without depending on the voice AI assistant service that is externally provided. The remote control operation mode is a mode in which the remote control operation is performed by the remote controller 11.

The text conversion server 40 receives the voice signal transmitted from the display control device 10, and inputs the voice signal into a text conversion unit 401. The text conversion unit 401 converts the voice signal that has been received into text data, and transmits the text data that has been converted to the display control device 10 via the network 60.

The display control device 10 receives the text data transmitted from the text conversion server 40, and inputs the text data into a command conversion unit 123. The command conversion unit 123 appropriately refers to, for example, a database for command conversion, converts the text data that has been received into a command, and supplies the command processing unit 122 with the command.

It is to be noted that by providing information of the command conversion unit 123, the database for command conversion, and the like in a server on the network 60, the display control device 10 may acquire the command corresponding to the text data from the server. In other words, it can be said that in the display control device 10, the communication unit 106 receives information for the voice utterance (for example, text data, commands, and the like) from the server such as the text conversion server 40 via the network 60.

In this situation, the command conversion unit 123 appropriately inquires of an erroneous conversion support unit 124 to absorb an erroneous conversion of the text data. The erroneous conversion support unit 124 includes an erroneous conversion absorption unit 131 and a morpheme analysis unit 132.

The erroneous conversion absorption unit 131 refers to an internal conversion table that has been prepared beforehand, and absorbs the erroneous conversion of the text data from the command conversion unit 123. In such an internal conversion table, for example, words that cannot be converted correctly are extracted beforehand and are respectively associated with correct words. When the morpheme analysis unit 132 absorbs the erroneous conversion by the erroneous conversion absorption unit 131, the morpheme analysis unit 132 divides the text data into a sequence of morphemes as necessary, and performs a process of distinguishing between the parts of speech of the respective morphemes.

It is to be noted that a process of supporting such an erroneous conversion is not limited to being performed by the erroneous conversion support unit 124 on the display control device 10 side (a local side). An erroneous conversion support unit 501 on the erroneous conversion correction and morpheme analysis server 50 side (a cloud side) may perform the process. That is, the command conversion unit 123 appropriately inquires of the erroneous conversion correction and morpheme analysis server 50 via the network 60, so as to be capable of absorbing the erroneous conversion of the text data.

Specifically, the erroneous conversion support unit 501 includes an erroneous conversion correction unit 511 and a morpheme analysis unit 512. The erroneous conversion correction unit 511 is configured in a similar manner to the erroneous conversion absorption unit 131, refers to a conversion table that has been prepared beforehand, and corrects the erroneous conversion of the text data. The morpheme analysis unit 512 is configured in a similar manner to the morpheme analysis unit 132, and performs a process of distinguishing between the parts of speech of the morphemes included in the text data as necessary.

The command processing unit 122 processes the command supplied from the command conversion unit 123, so that an action in response to the voice utterance made by the user is conducted.

In this manner, the display control device 10 is capable of operating in the smart voice mode to convert the command into an appropriate command without depending on the platform of the voice AI assistant service that is externally provided, so that the voice operation in response to the voice utterance made by the user can be performed.

It is to be noted that in the display control device 10 of FIG. 3, the voice input unit 121, the command processing unit 122, the command conversion unit 123, and the erroneous conversion support unit 124 are provided, for example, as parts of the functions of the controller 101.

The display control device 10 is configured as described above.

(Example of Menu Screen in Smart Voice Mode)

These years, by the way, voice operations for devices such as smart speakers (AI speakers) are in widespread use. The display control devices 10 such as television receivers also support the voice operation in response to the voice utterance made by a user, in addition to the remote control operation performed by the user.

However, even in a case where the display control device 10 supports the voice operation, in general, users do not know what kind of functions are operable in a voice operation, and do not know words or grammars of the utterances available in the voice operation. In addition, as the number of the commands supporting the voice operations increases, in general, users are unable to remember all those commands.

Figure 4:
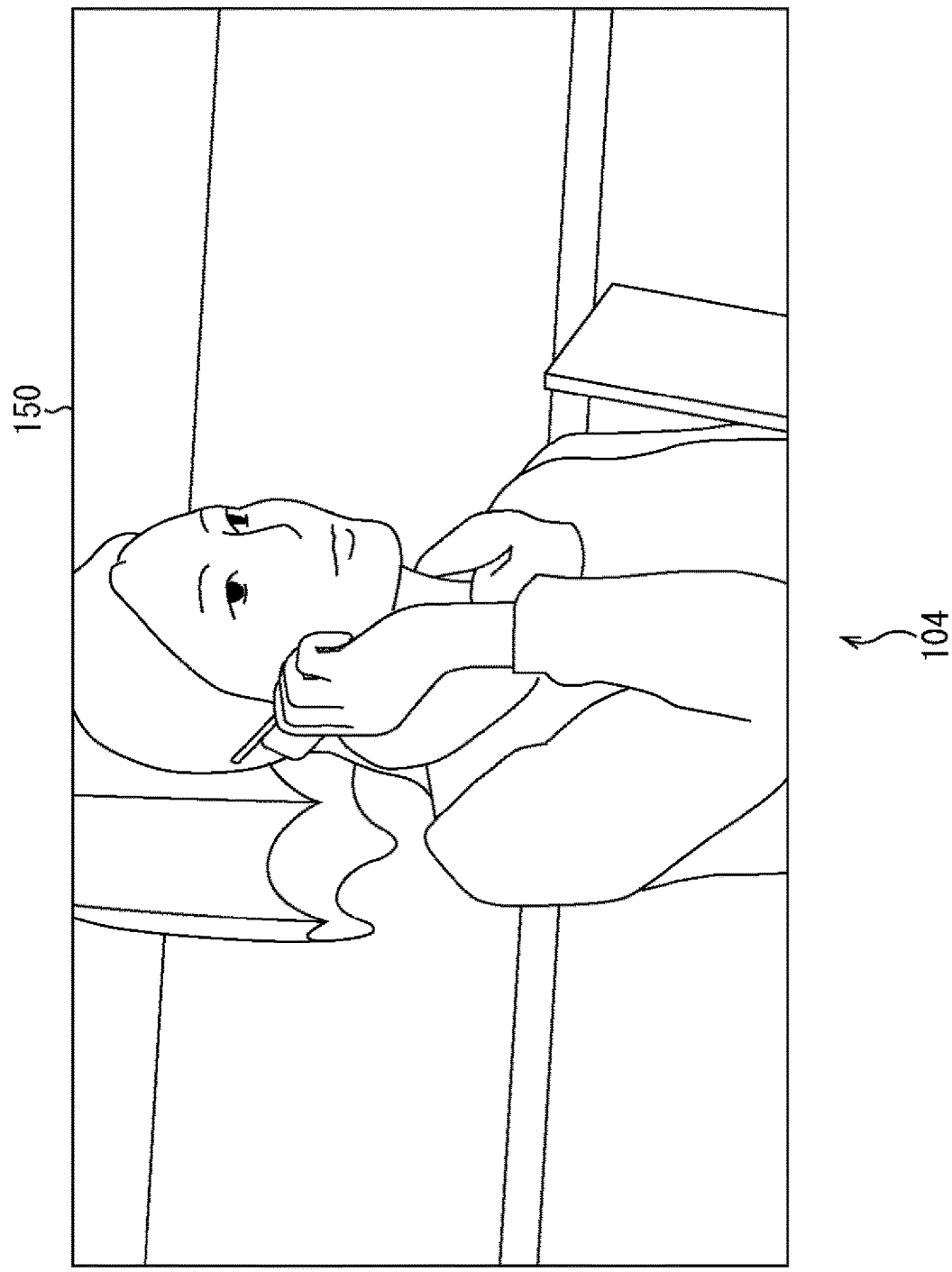
FIG. 4 is a diagram showing a display example of a television viewing/listening screen.
Figure 5:
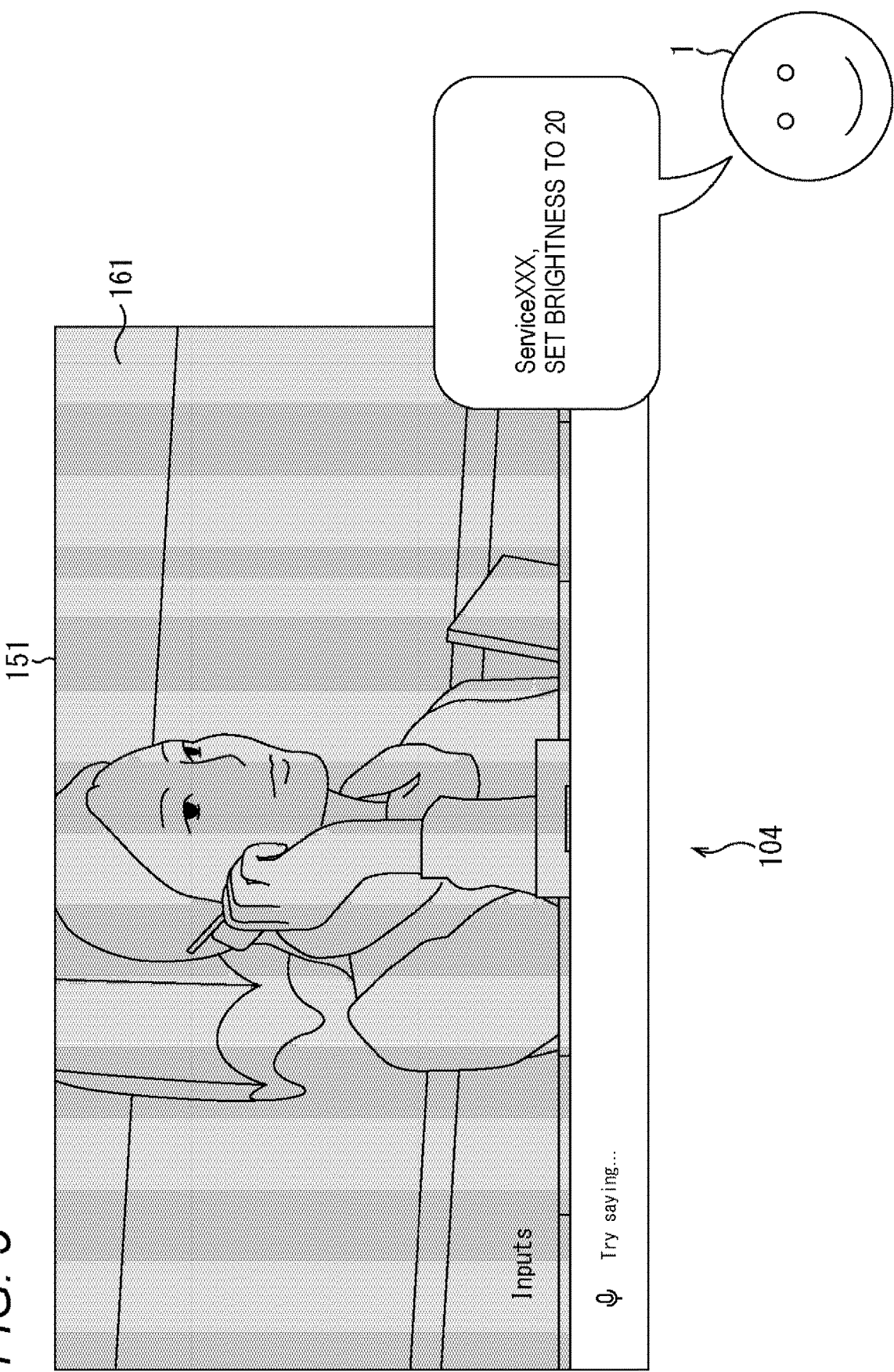
FIG. 5 is a diagram showing an example of a voice operation of a current situation.

Here, as shown in FIG. 4, it is assumed that a television viewing/listening screen 150 is displayed on the display unit 104 in the display control device 10 and a television program is being viewed/listened to by a user. In this situation, FIG. 5 shows a state in which an instruction to adjust the brightness of the display screen of the display control device 10 is given by a voice operation performed by a user, as a voice operation of a current situation. FIG. 5 shows a television viewing/listening screen 151 indicating that the voice operation is being recognized in response to the voice operation performed by a user 1.

In the example of FIG. 5, when the user 1 makes a voice utterance "Service XXX, set brightness to 20", the brightness of the display screen can be adjusted. However, it is difficult for general users to make such an utterance suddenly. In addition, it is also assumed that the brightness of the display screen is not adjustable by the voice utterance "Service XXX, set the brightness to 20".

Therefore, in the display control device 10, the smart voice mode is activated as the action mode, and when the user makes a voice utterance of an item to be read aloud on a main menu screen, the voice operation in response to the voice utterance is performed.

(Example of Quick Setting Menu Superimposition Screen)

Figure 6:
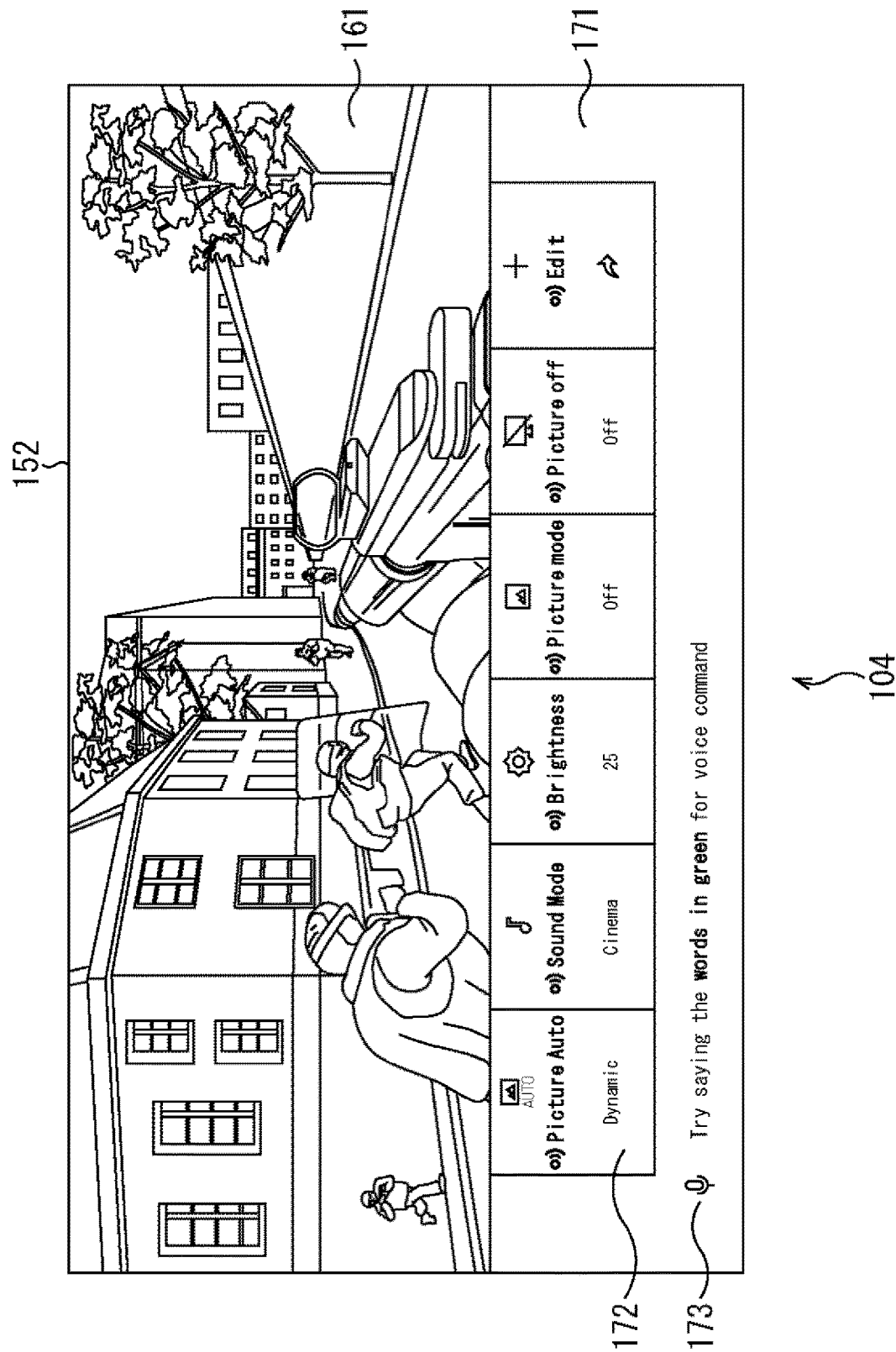
FIG. 6 is a diagram showing a display example of a quick setting menu superimposition screen.

For example, FIG. 6 shows a quick setting menu superimposition screen 152 as an example of a menu screen. Here, a quick setting menu denotes a setting menu by which the settings of a television receiver are changeable in a simple manner while viewing/listening to a television program.

On such a quick setting menu superimposition screen 152, a quick setting menu 171 is displayed (displayed in a superimposed manner) at the bottom of a television program video 161, so that a desired setting item can be selected by the voice operation from various setting items 172 displayed on the quick setting menu 171. It is to be noted that in addition to the superimposed display, for example, the quick setting menu 171 is assumed to have a display form such as a two-screen display, a slave screen display, a transparent display, or the like.

That is, as the setting items 172, for example, picture auto ("Picture Auto"), sound mode ("Sound Mode"), brightness ("Brightness"), picture mode ("Picture Mode"), picture off ("Picture off"), and the like are displayed in the quick setting menu 171. Therefore, the user reads aloud an item such as "sound mode", "picture mode", or the like from the setting items 172 that are displayed, so that the voice operation in response to the voice utterance is performed, and a setting item such as "sound mode" or the like is set.

In this situation, one or a plurality of setting items displayed as the setting item 172 becomes a voice operable item (an item to be read aloud), the user can easily grasp the item to be read aloud. In addition, the user reads aloud wording (information regarding the voice operation) included in a desired setting item without change from one or a plurality of setting items displayed as the setting item 172. Therefore, the user is able to intuitively understand what kind of function is operable by the voice operation and immediately understand the wording of the utterance (for example, words and grammars) available in the voice operation.

In addition, in a lower area of the quick setting menu 171, wording "Try saying the words in green for voice command" is displayed together with a microphone icon, as a voice operation guide 173. In the example of FIG. 6, green character items, which correspond to the wording "words in green", are indicated in bold, and the wording of "Picture Auto", "Sound Mode", "Brightness", "Picture Mode", "Picture off", "Edit", and the like respectively displayed together with icons in the various setting items 172 indicates character items (recommended read aloud items).

It is to be noted that it is assumed that the items described as the green text items are displayed in bold or underlined in a distinguishing manner from other texts that do not support the voice operation. The point is that it is sufficient only if the text supporting the voice operation and the text not supporting the voice operation are displayed in a distinguishing manner, and any display forms of the texts are applicable.

(Example of Input Switching Menu Superimposition Screen)

Figure 7:
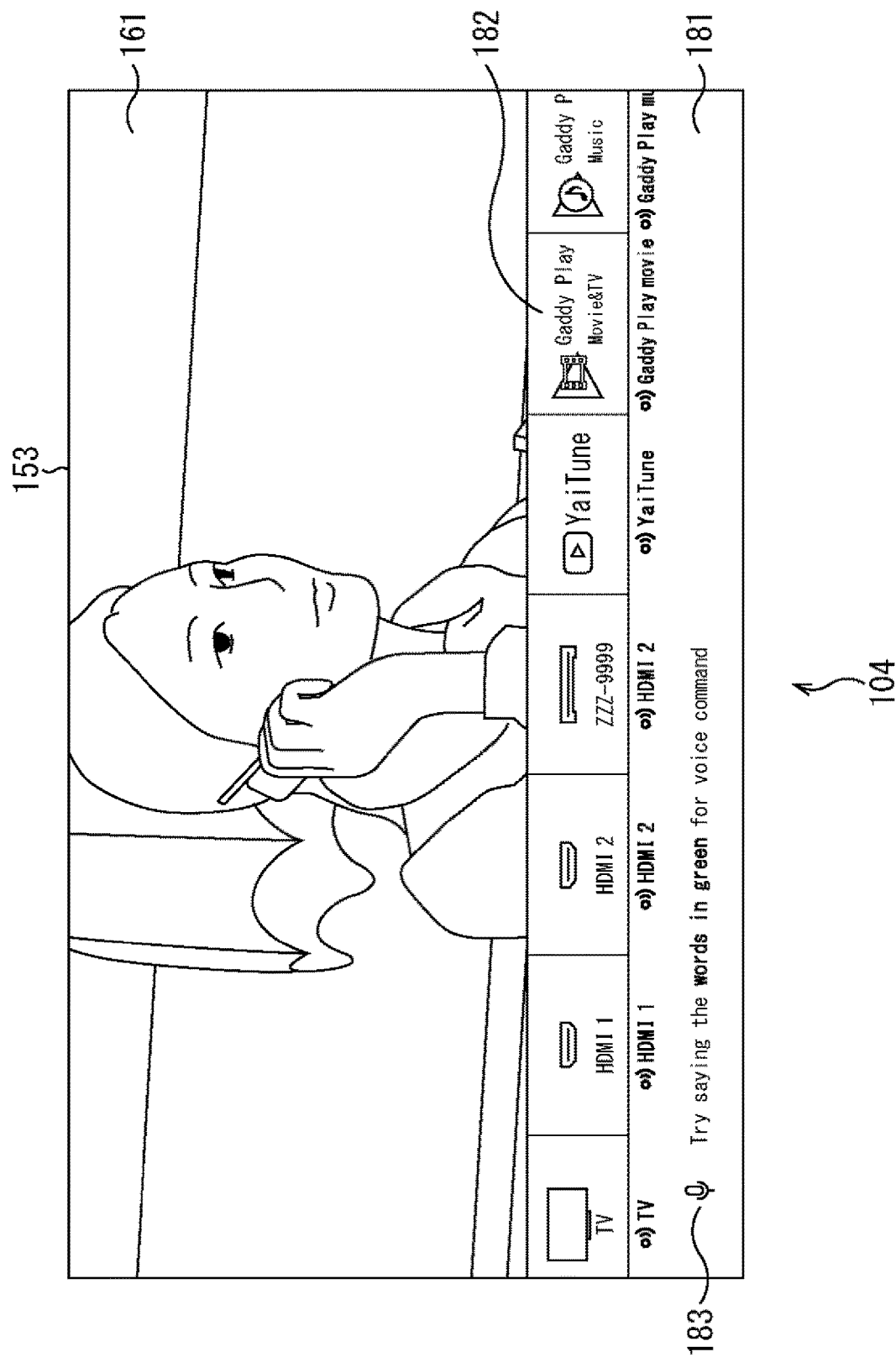
FIG. 7 is a diagram showing a display example of an input switching menu superimposition screen.

FIG. 7 shows an input switching menu superimposition screen 153 as an example of the menu screen. Here, an input switching menu denotes a setting menu by which an input switching destination of the television receiver is selectable in a simple manner while viewing/listening to a television program.

On such an input switching menu superimposition screen 153, an input switching menu 181 is displayed (displayed in a superimposed manner) at the bottom of the television program video 161, so that a desired switching item is selectable by the voice operation from various switching items 182 displayed on the input switching menu 181. It is to be noted that in addition to the superimposed display, the display of the input switching menu 181 may be, for example, a two-screen display, a slave screen display, a transparent display, or the like.

That is, the input switching menu 181 includes a television ("TV") for inputting the video of a television program selected by a tuner, high-definition multimedia interface (HDMI) (registered trademark) ("HDMI1", "HDMI2") for inputting videos of various contents in compliance with a given interface such as HDMI, an item for inputting a communication content to be distributed via the network 60, and the like, as the switching items 182 for switching the video to be displayed on the display screen.

The user reads aloud an item, for example, "TV", "HDMI1", or the like from one or a plurality of switching items (items) displayed as the switching items 182 that are displayed. The voice operation in response to the voice utterance is performed, and the input is switched to the switching item such as "TV".

Further, in a lower area of the input switching menu 181, a voice operation guide 183 is displayed. In the example of FIG. 7, the green character items, which correspond to the wording "words in green" displayed in the voice operation guide 183, are indicated in bold. The wording of "TV", HDMI1", "HDMI2", and the like respectively displayed together with icons in the various switching items 182 indicate character items (the recommended read aloud items). It is to be noted that the green character item, that is, the text corresponding to the voice operation may be displayed in another display form as long as it is distinguished from the text that does not correspond to the voice operation.

(Example of Television Menu Superimposition Screen)

Figure 8:
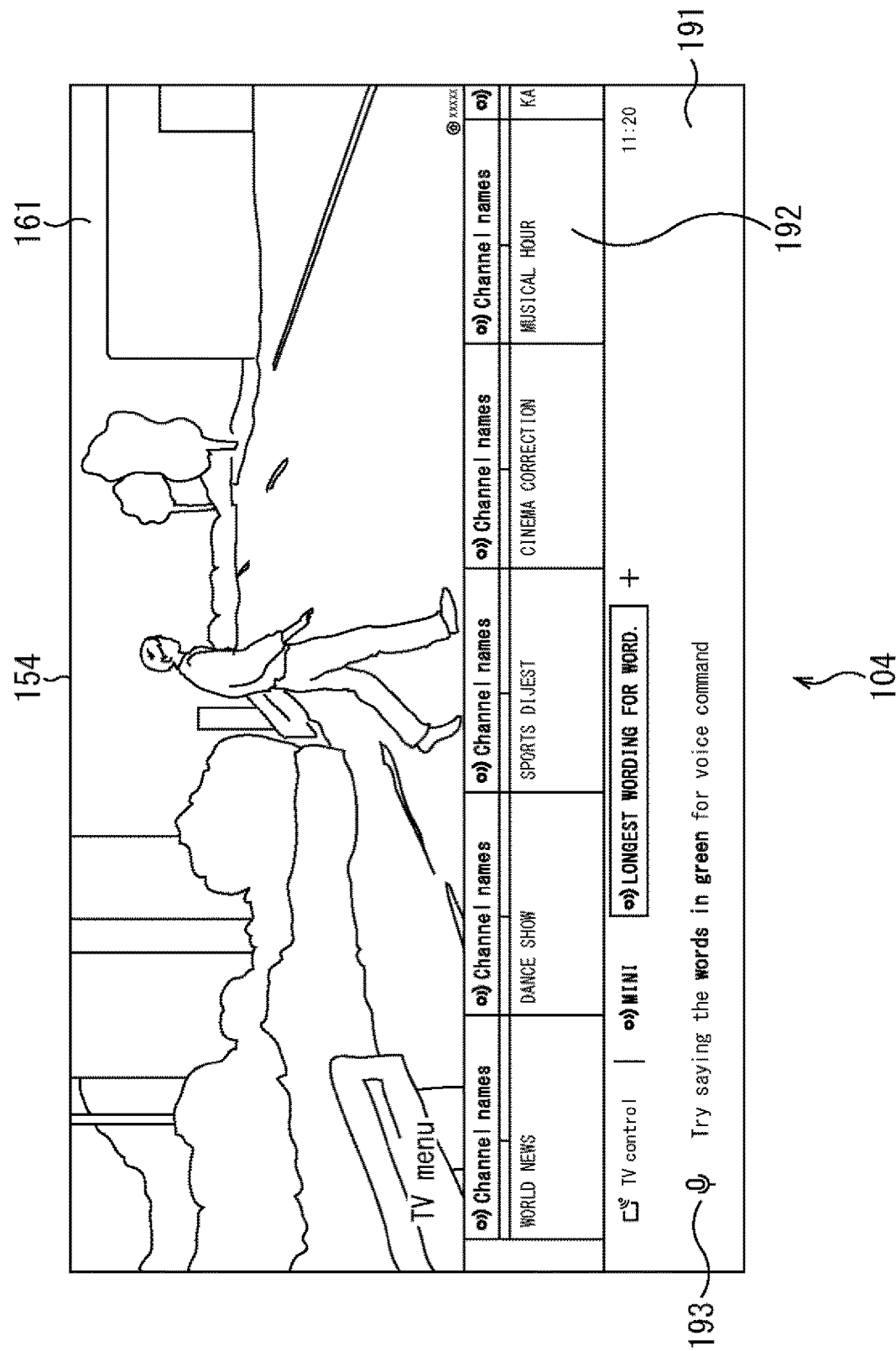
FIG. 8 is a diagram showing a display example of a television menu superimposition screen.

FIG. 8 shows a television menu superimposition screen 154 as an example of the menu screen. Here, the television menu is a setting menu that enables a selection destination of the television receiver in a simple manner while viewing/listening to a television program.

On such a television menu superimposition screen 154, the television menu 191 is displayed (superimposed display) at the bottom of the television program video 161, so that a desired program is selectable by the voice operation from a program table 192 displayed on the television menu 191. It is to be noted that in addition to the superimposed display, the display of the television menu 191 may be, for example, a two-screen display, a slave screen display, a transparent display, or the like.

That is, the television menu 191 includes items such as information regarding other channels (for example, information regarding program names and outlines of programs on different channels) as the program table 192, while the television program video 161 is being viewed/listened to. The user reads aloud an item such as the program name of a desired program on a different channel ("Channel names"), for example, from the program table 192 that is displayed. Then, the voice operation in response to the voice utterance is performed, so as to switch to the channel of the program name that has been read aloud.

Further, in a lower area of the television menu 191, the voice operation guide 193 is displayed. In the example of FIG. 8, the green character items, which correspond to the wording "words in green" displayed in the voice operation guide 193 is indicated in bold. The wording of the program names ("Channel names") and the like respectively displayed together with icons in the program table 192 indicates character items (the recommended read aloud items). It is to be noted that the green character item, that is, the text corresponding to the voice operation may be displayed in another display form as long as it is distinguished from the text that does not correspond to the voice operation.

As described above, in the display control device 10, in the smart voice mode, the menu screen such as the quick setting menu superimposition screen 152, the input switching menu superimposition screen 153, or the television menu superimposition screen 154 can be displayed. However, the menus of the respective screens are standardized in the specification.

That is, on each menu screen, for example, a method for displaying the recommended read aloud items, a method for presenting an operation guide for reading aloud, a method for transitioning to the smart voice mode, a method for feeding back various information, and the like are standardized. In this manner, by standardizing the specifications of various menus, users are able to perform similar operations on every menu, and intuitive operations with high usability are enabled.

Figure 9:
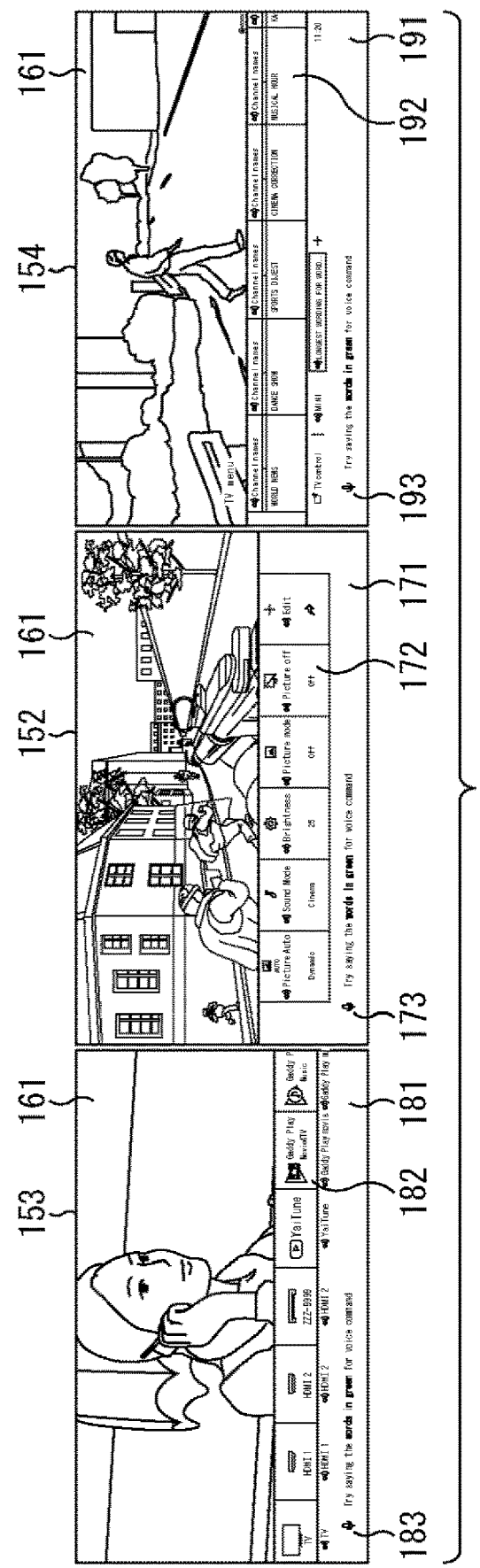
FIG. 9 is a diagram showing a standardization example of menu screens by a smart voice mode.

Specifically, as shown in FIG. 9, in the quick setting menu 171 of the quick setting menu superimposition screen 152, the input switching menu 181 of the input switching menu superimposition screen 153, and the television menu 191 of the television menu superimposition screen 154, the recommended read aloud items in the setting items 172, the switching items 182, and the program table 192 are standardized in the presentation.

Further, as shown in FIG. 9, in the quick setting menu 171, the input switching menu 181, and the television menu 191, the wording of "Try saying the words in green for voice command" is displayed as the voice operation guide 173, the voice operation guide 183, and the voice operation guide 193, in predetermined lower areas respectively together with microphone icons. The methods for presenting the operation guide for reading aloud are standardized. In this manner, by standardizing the specifications of various menus, users are able to perform similar operations on every menu, and intuitive operations with high usability are enabled.

Figure 10:
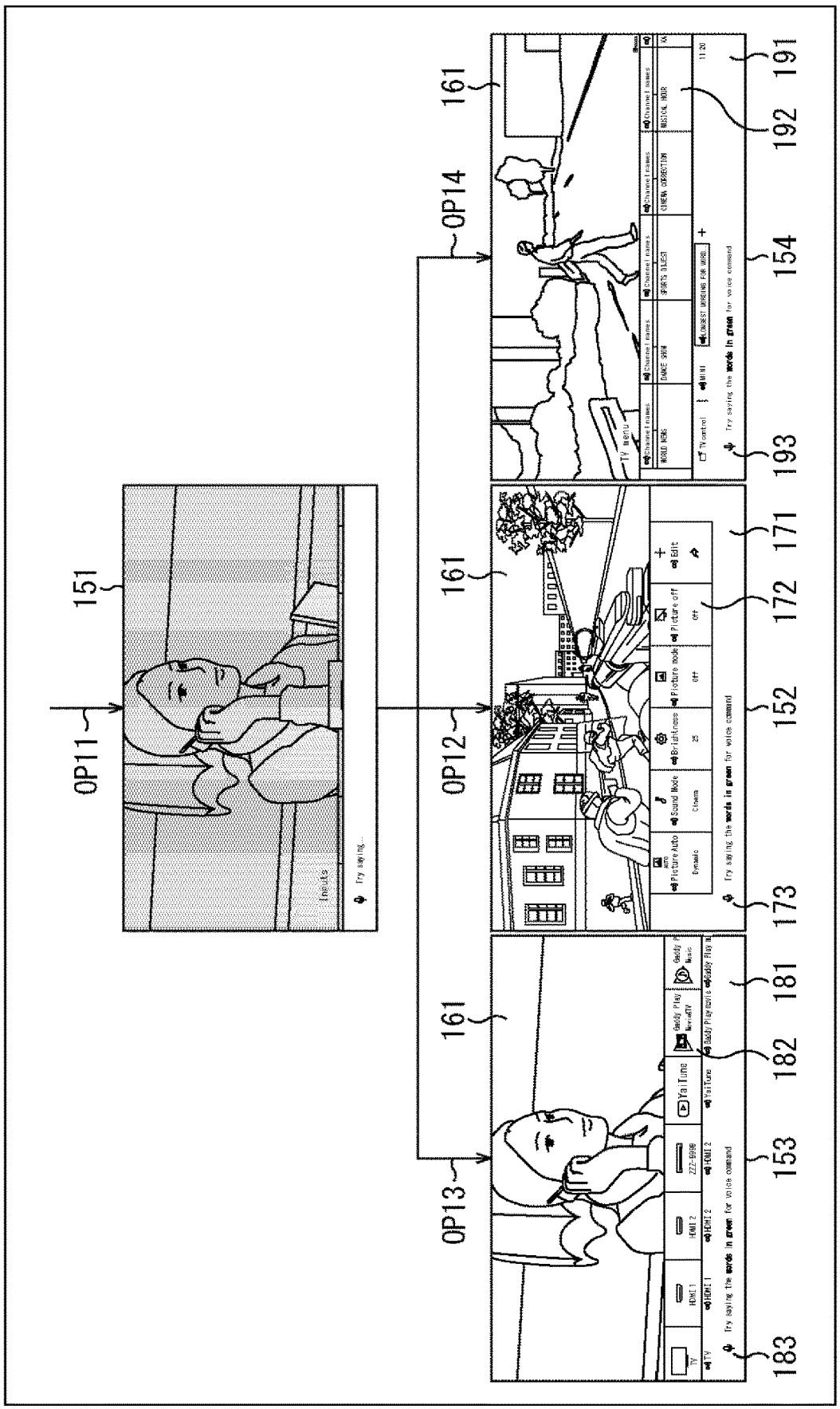
FIG. 10 is a diagram showing an activation example of each menu screen at the time of transitioning to the smart voice mode.

Here, FIG. 10 shows an example of activating each menu screen at the time of transitioning to the smart voice mode.

For example, in the display control device 10, in a case where a user issues a wake word "Service XXX" (OP11) when the television viewing/listening screen 150 (FIG. 4) is displayed, the action mode transits to the agent mode, and accepts a voice operation. It is to be noted that here, the voice operation may be accepted when the microphone activation button provided on the remote controller 11 is pushed (OP11).

On the other hand, for example, in the display control device 10, in a case where the voice utterance "Service XXX, quick setting" is made (OP12) when the television viewing/listening screen 150 (FIG. 4) is displayed, the action mode transits to the smart voice mode. Then, the quick setting menu superimposition screen 152 is displayed. On the quick setting menu superimposition screen 152, the wording or the like of the setting items 172 included in the quick setting menu 171 is set as an item to be read aloud (a recommended read aloud item) at the time of the voice operation.

Further, for example, in the display control device 10, in a case where a voice utterance "Service XXX, input switching" is made (OP13) when the television viewing/listening screen 150 (FIG. 4) is displayed, the action mode transits to the smart voice mode. Then, the input switching menu superimposition screen 153 is displayed. On the input switching menu superimposition screen 153, the wording or the like of the switching item 182 included in the input switching menu 181 is set as an item to be read aloud (the recommended read aloud item) at the time of the voice operation.

Further, for example, in the display control device 10, when a voice utterance "Service XXX, television menu" is made (OP14) when the television viewing/listening screen 150 (FIG. 4) is displayed, the action mode transits to the smart voice mode. Then, the television menu superimposition screen 154 is displayed. On the television menu superimposition screen 154, the wording such as the program name in the program table 192 displayed on the television menu 191 is set as an item to be read aloud (the recommended read aloud item) at the time of the voice operation.

In this manner, the activation method for activating each menu screen from the television viewing/listening screen 150, that is, the transition method for transitioning from the remote control operation mode (or the agent mode) to the smart voice mode is standardized. By standardizing the specifications of various menus, users are able to perform similar operations on every menu, and intuitive operations with high usability are enabled.

It is to be noted that in FIG. 10, the voice operation in the agent mode is enabled on the television viewing/listening screen 151. However, after the wake word "Service XXX" is uttered or after the microphone activation button is operated, the action (behavior) is managed by a service provider that provides the platform of the voice AI assistant service. Therefore, it is a scope that when the specification changes is unknown for the manufacturer that designs and manufactures the display control device 10 such as the television receiver.

On the other hand, in FIG. 10, the voice operation in the smart voice mode is available on the quick setting menu superimposition screen 152, the input switching menu superimposition screen 153, and the television menu superimposition screen 154. Without accepting the wake word "Service XXX", the manufacturer side is capable of managing the action.

(Example of Transitioning to Smart Voice Mode)

Figure 11:
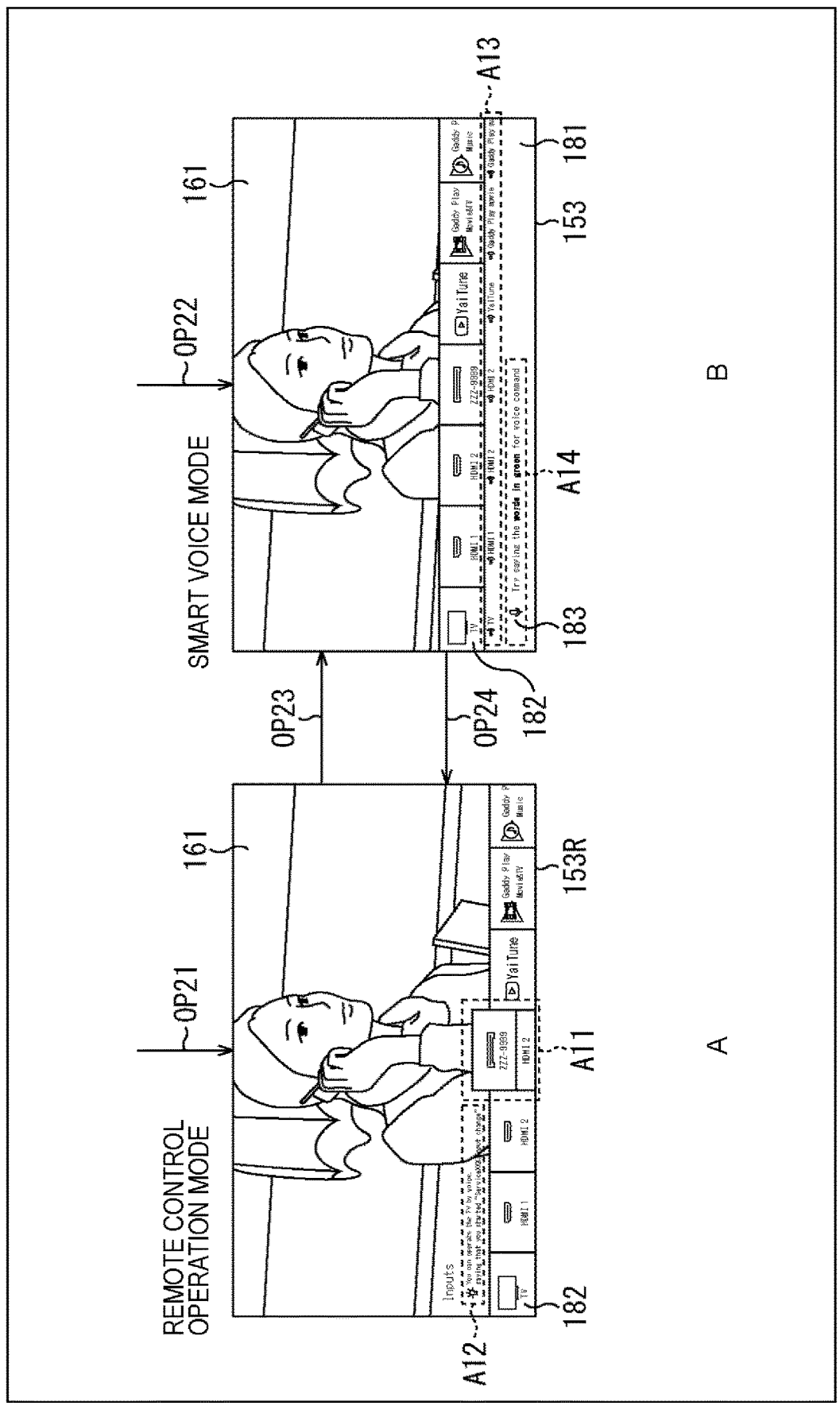
FIG. 11 is a diagram showing a transition example between a remote control operation mode and the smart voice mode.

Here, FIG. 11 shows an example of transitioning between the remote control operation mode and the smart voice mode. A of FIG. 11 shows an input switching menu superimposition screen 153R in the remote control operation mode, and B of FIG. 11 shows an input switching menu superimposition screen 153 in the smart voice mode.

On the input switching menu superimposition screen 153R (A of FIG. 11), when an input switching button is operated by a remote control operation performed by a user (OP21), a switching item to be selected is displayed with a cursor (area A11) among the various switching items 182 displayed at the bottom of the television program video 161.

In addition, the wording "You can operate the TV by voice. saying that you started "Service XXX, input change"" is displayed on the input switching menu superimposition screen 153R, indicating that the voice operation is available (area A12). In this manner, by indicating the user that the voice operation is available even during the remote control operation, the use of the voice operation with high usability can be encouraged for the user.

In the display control device 10, at the time of displaying the television viewing/listening screen 150 (FIG. 4), displaying the input switching menu superimposition screen 153R (A of FIG. 11) or the like, in a case where the user makes a voice utterance "Service XXX, input switching" (OP22, OP23), the remote control operation mode is transitioned to the smart voice mode, and the input switching menu superimposition screen 153 (B of FIG. 11) is displayed.

On the input switching menu superimposition screen 153 (B of FIG. 11), there is no cursor display for selecting the switching item 182 at the bottom of the television program video 161. The switching items 182 and the voice operation guide 183 are displayed as the input switching menu 181.

In the switching items 182, the wording of the items to be read aloud (the recommended read aloud items) is changed and displayed in a predetermined color (for example, green) together with the icon indicating a recommendation to be read aloud (area A13). Further, in the voice operation guide 183, wording such as "TV", "HDMI1", "HDMI2", and the like included in the various switching items 182 indicates the items (area A14).

It is to be noted that in the display control device 10, when the input switching menu superimposition screen 153 (B of FIG. 11) is displayed and the remote control operation is performed by the user (OP24), the smart voice mode is transitioned to the remote control operation mode, and the input switching menu superimposition screen 153R (A of FIG. 11) is displayed.

(Example of Voice Operation Guide)

Figure 12:
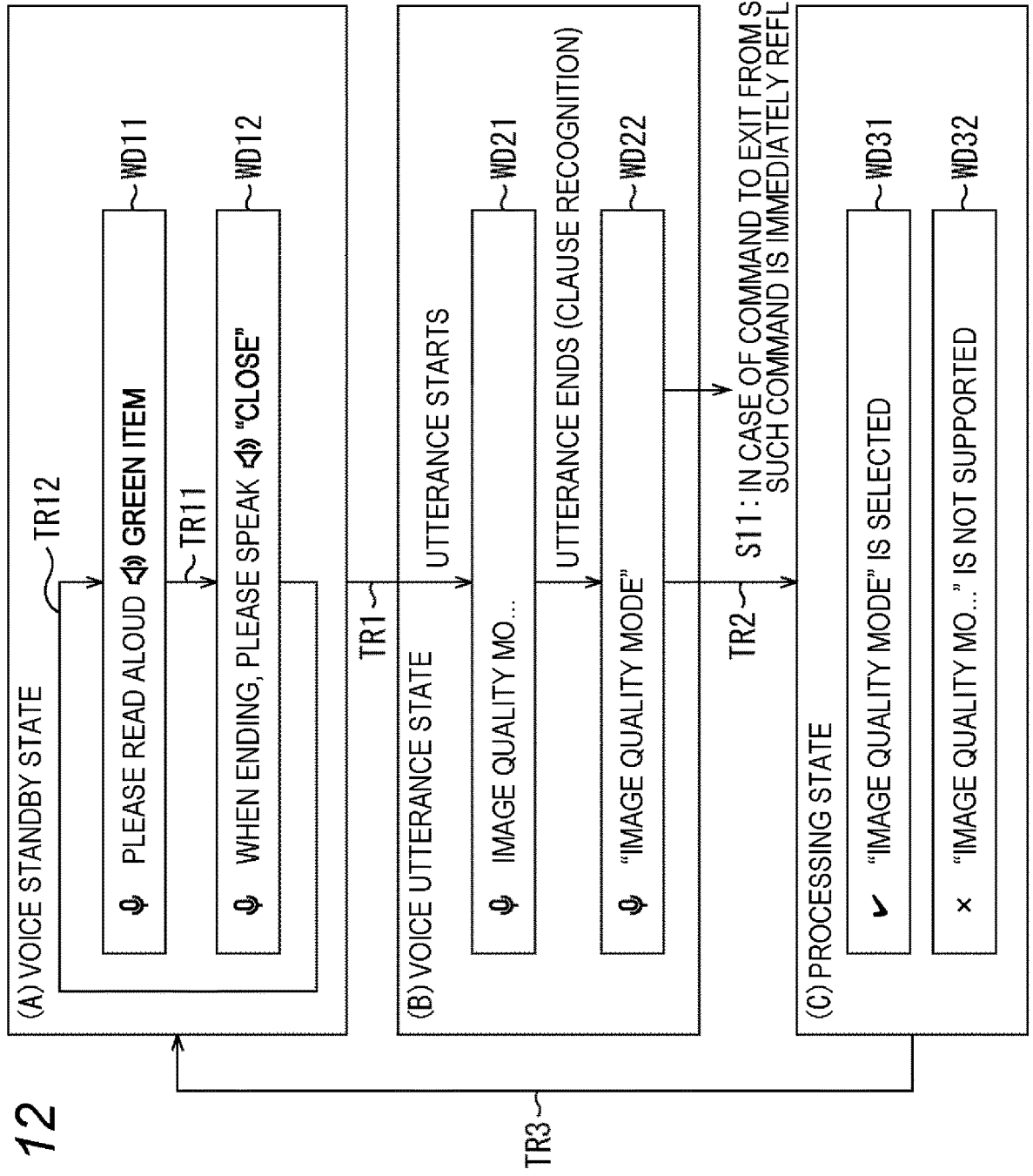
FIG. 12 is a diagram showing a display example of a voice operation guide for reading aloud to be displayed on each menu screen.

FIG. 12 shows a display example of a voice operation guide for reading aloud to be displayed on each menu screen. It is to be noted that in FIG. 12, the voice operation guide 173 of the quick setting menu 171 will be described as an example as the voice operation guide for reading aloud.

In the display control device 10, the display timing of the voice operation guide 173 is distinguishable into three states that are a voice standby state, a voice utterance state, and a processing state. The state transitions among these three states in the order of the voice standby state, the voice utterance state, and the processing state (TR1, TR2), returns to the voice standby state after the processing state (TR3), and repeats transitioning among the three states again.

During the voice standby state of A of FIG. 12, the voice utterance to be made by a user is awaited. On the voice operation guide 173, the transition between wording WD11 "please read aloud a green item" and wording WD12 "when ending, please speak "close"" is repeated at a predetermined timing (TR11, TR12), and the wording WD11 and the wording WD12 are displayed alternately.

In this situation, the microphone icons included in the wording WD11 and the wording WD12 are displayed in animation. That is, the wording WD11 is an utterance induced guide for an item (a recommended read aloud item), and the wording WD12 is an operating instruction for a special operation such as how to exit from the smart voice mode. It is to be noted that here the wording WD11 and the wording WD12 have been described as examples, but another type of wording may be displayed. In addition, three or more types of wording may be displayed repeatedly.

The voice utterance state of B of FIG. 12 denotes that the user is making a voice utterance. Once the user starts the voice utterance, for example, wording WD21 "image quality mo . . . " is displayed according to the content of the voice utterance in real time on the voice operation guide 173. Then, clauses are recognized from the voice utterance. When the user finishes the voice utterance, for example, wording WD22 "image quality mode" is displayed in response to the content of the voice utterance on the voice operation guide 173.

It is to be noted that in a case where the content of the voice utterance here corresponds to, for example, a command to exit from the smart voice mode, such a command is immediately processed (reflected) to end a target function in the smart voice mode (S11). However, as an action after processing the command, for example, another action such as transitioning from the smart voice mode to the remote control operation mode may be conducted.

The processing state of C of FIG. 12 denotes a state in which a command corresponding to the content of the voice utterance made by the user is processed. In a case where the command is normally recognized, wording WD31 ""image quality mode" is selected" is displayed on the voice operation guide 173.

Here, it is assumed that when a command is recognized, the user's line of sight is at (near) the voice operation guide 173. Therefore, the command processing unit 122 is capable of immediately processing (immediately reflecting) the command corresponding to the "image quality mode", and in addition, is capable of presenting the content of execution of the command on the voice operation guide 173.

It is to be noted that the timing of processing the command may be the same with the timing of displaying the wording WD31 (immediate reflection), or may be the timing after a predetermined time has elapsed since the wording WD31 is displayed (time difference reflection). Further, for example, the wording WD31 is displayed for a predetermined period, such as one second. Further, even while the wording WD31 is being displayed, in a case where the user makes a voice utterance, the state is transitioned to the voice utterance state.

On the other hand, in a case where the content of the voice utterance made by the user is not completely recognized and an error occurs because the command in response to the voice utterance cannot be identified, wording W32 ""image quality mo . . . " is not supported" is displayed on the voice operation guide 173. Here, when an error occurs, its reason can be fed back to the user.

In this manner, by certainly informing the user that the command recognition has failed, the effect of prompting the user to make a next utterance can be brought. For example, the wording WD32 is displayed for a predetermined period such as one second. Further, even while the wording WD32 is being displayed, in a case where the user makes a voice utterance again or the like for correcting the utterance, the state is transitioned to the voice utterance state.

It is to be noted that in the example of FIG. 12, the voice operation guide 173 of the quick setting menu 171 has been described as an example. However, similar displaying corresponding to the content of the menu is enabled also on the voice operation guide 183 of the input switching menu 181 or the voice operation guide 193 of the television menu 191.

Further, the display position of the voice operation guide 173 for reading aloud to be displayed on each menu screen is not limited to the lower area, and may be displayed in another area. For example, as the display position of the voice operation guide 173, the voice operation guide 173 may be dynamically moved to the vicinity of the display screen area (UI area) intended to be viewed by the user for the purpose of guiding the user's line of sight. By guiding the user's line of sight, effective presentation of the information to be provided to the user is enabled.

Figure 13:
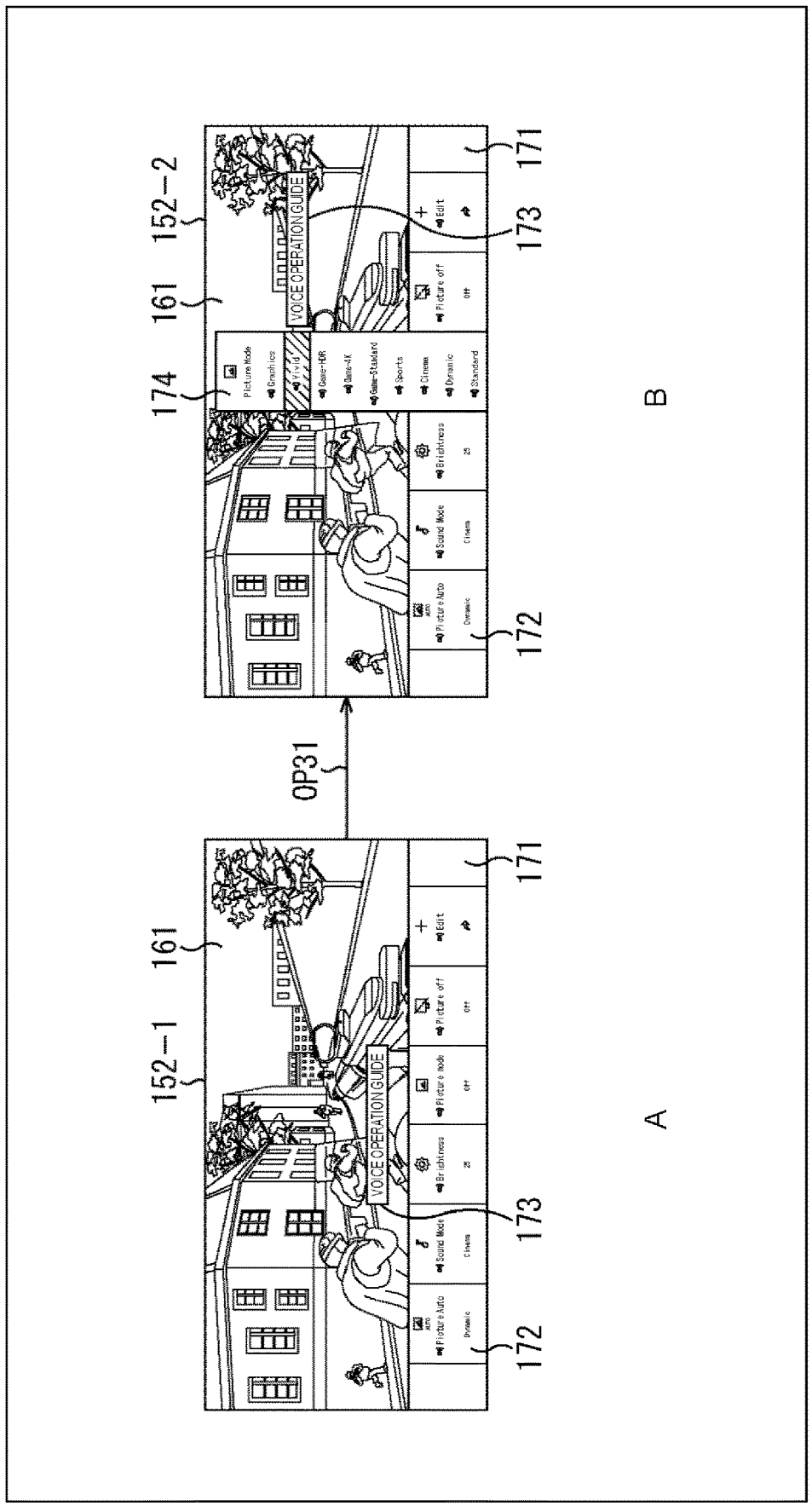
FIG. 13 is a diagram showing another example of a display position of the voice operation guide for reading aloud to be displayed on each menu screen.

FIG. 13 shows another example of the display position of the voice operation guide 173 for reading aloud to be displayed on the quick setting menu 171. A of FIG. 13 shows a quick setting menu superimposition screen 152-1 including the above-described quick setting menu 171, and B of FIG. 13 is a quick setting menu superimposition screen 152-2 including the quick setting menu 171 as a two-layer hierarchical menu.

For example, on the quick setting menu superimposition screen 152-1 (A of FIG. 13), the voice operation guide 173 is displayed in (near) an upper area of the setting items 172 in the center of the quick setting menu 171. By displaying the voice operation guide 173 in this area, for example, the user's line of sight can be guided to (near) the central part of the quick setting menu 171.

Further, for example, after a picture mode (Picture Mode) is selected as the setting item 172 in the horizontal direction on a quick setting menu superimposition screen 152-2 (B of FIG. 13), when a setting value 174 for the picture mode in the vertical direction is selected, the voice operation guide 173 is displayed in an area on the right side of the setting value 174. By displaying the voice operation guide 173 in this area, for example, the user's line of sight can be focused on (near) the setting value "Vivid", which is being selected.

It is to be noted that details of displaying the hierarchical menu of the quick setting menu 171 on the quick setting menu superimposition screen 152-2 (B of FIG. 13) will be described later with reference to FIGS. 25 to 27. Further, the voice operation guide 183 of the input switching menu 181 or the voice operation guide 193 of the television menu 191 can be dynamically moved in a similar manner to the voice operation guide 173 described above. By guiding the user's line of sight in this manner, effective presentation of the information to be provided to the user is enabled.

(Example of Item Display Area)

FIG. 14 shows an example of an area including an item to be read aloud (hereinafter, referred to as an item display area) in the quick setting menu 171 of the quick setting menu superimposition screen 152. It is to be noted that FIG. 15 shows descriptions of the respective item display areas on the quick setting menu 171, and will be described with reference appropriately.

In FIG. 14, the quick setting menu 171 includes four areas A21 to A24 respectively as the item display areas.

That is, in the area A21, the recommended read aloud items included in the various setting items 172 are respectively represented with icons and characters in a predetermined color (for example, green) (FIG. 15). Specifically, as the recommended read aloud items, the items such as Picture Auto ("Picture Auto") and Sound Mode ("Sound Mode") are displayed in green characters (bold in the figure). Therefore, the user is able to easily understand the items to be read aloud and immediately understand the wording of the utterance available in the voice operation.

In addition, in the area A22, items other than the recommended read aloud items included in the various setting items 172 can be also read aloud. As a behavior when an item other than the recommended read aloud items is read aloud, it is treated such that the characters in the corresponding area A21 have been read aloud (FIG. 15).

In other words, in a case where a related item related to the recommended read aloud item is read aloud, it is considered that a voice utterance corresponding to the recommended read aloud item related to the related item has been made. Specifically, in a case where, for example, "cinema "Cinema"" is read aloud as the item (the related item) other than the recommended read aloud item, a setting action corresponding to the sound mode is conducted.

Further, the area A23 includes an area in the outside of the display screen (a non-display area), and items in the outside of the display screen can be read aloud (FIG. 15). That is, for example, in a case where there is a large number of the setting items 172 and the like, it is assumed that all the setting items 172 cannot be displayed in the inside of the display screen. However, in such a case, not only the recommended read aloud items included in the setting items 172 displayed in the inside of the display screen but also the wording of the setting item 172 in the outside of the display screen (non-display wording) are included in the items to be read aloud.

Consequently, by reading aloud the item included in the setting items 172 in the inside of the display screen (a first item in the inside of the display screen) and the item included in the setting items 172 in the outside of the display screen (a second item in the outside of the display screen), the user is able to perform the voice operation for the setting action corresponding to the first item in the inside of the display screen or the second item in the outside of the display screen, so as to enable the voice operation with higher usability.

It is to be noted that as shown in the area A24, at the time of displaying the quick setting menu 171, for example, commands for screen operations, such as "close" for ending the quick setting menu 171 and "next" or "forward" for scrolling in a predetermined direction (for example, in the horizontal direction) can be read aloud (FIG. 15). However, it is assumed that the scroll here is treated as a page scroll instead of the unit of item, but another scroll such as a partial scroll may be applicable. Also, in this situation, it is unnecessary to make an utterance of the wake word "Service XXX", as described above.

Here, at the time of reading aloud the items included in the item display area, for example, four problems shown in FIG. 16 are assumed.

That is, firstly, a case where a plurality of types of the same wording (items) is present in the inside of the display screen is assumed. Such a case corresponds to, for example, a case where a plurality of types of wording "ON" is respectively present as the items in the item display area. As a solution to such a first problem, for example, it is sufficient if an item present at a position closest to an upper left position (a reference position) of the display screen is given priority. That is, important items are arranged on the left side of the display screen in many cases. Therefore, by giving priority to the left side, an item that seems to have a higher priority is selectable.

It is to be noted that the upper left position of the display screen is an example of the reference position. For example, in a right-to-left (RTL) language, it is sufficient if an upper right position of the display screen is used as the reference position. Furthermore, an item present at any position in the inside of the display screen may be given priority. For example, the user's line of sight stays at the center in the inside of the display screen in many cases. Therefore, by giving priority to an item at (the position of) the center in the inside of the display screen, selection of an item that meets a user's intention is enabled.

Secondly, a case where the wording displayed in the inside of the display screen is long is assumed. Such a case corresponds to, for example, a case where a long title is given as an item to a program name of a television program is present in the item display area. As a solution to such a second problem, for example, it is sufficient if partial matching is allowed as matching of wording, and a part (for example, a starting part) of the title is used for matching. Consequently, even in a case of a short utterance, selection of an item intended by the user is enabled.

Thirdly, a case where the wording made by a voice utterance is so short that a clause division cannot be automatically determined is assumed. Such a case corresponds to, for example, a case where the user has made a voice utterance "ON". As a solution to such a third problem, for example, in the item display area, it is sufficient if reading that is available only in the smart voice mode is presented, such as "turn ON" as an item, instead of "ON".

Fourthly, a case where the voice utterance made by the user cannot be converted correctly due to the specification on the voice utterance text conversion side is assumed. As a solution to such a fourth problem, for example, on the display control device 10 side, it is sufficient if types of wording that cannot be converted correctly are extracted beforehand to create an internal conversion table, and the internal conversion table is used to absorb an erroneous conversion. Further, here, by referring to such an internal conversion table at the time of deciding the voice utterance made by the user, not at the time of deciding the command in response to the voice utterance made by the user, it is possible to reflect on feedback of the utterance decision.

Specifically, for example, it is assumed that when a user desires to hear only the sounds of a television program while viewing/listening to the television program, the user makes a voice utterance including wording "erase image".

Figure 17:
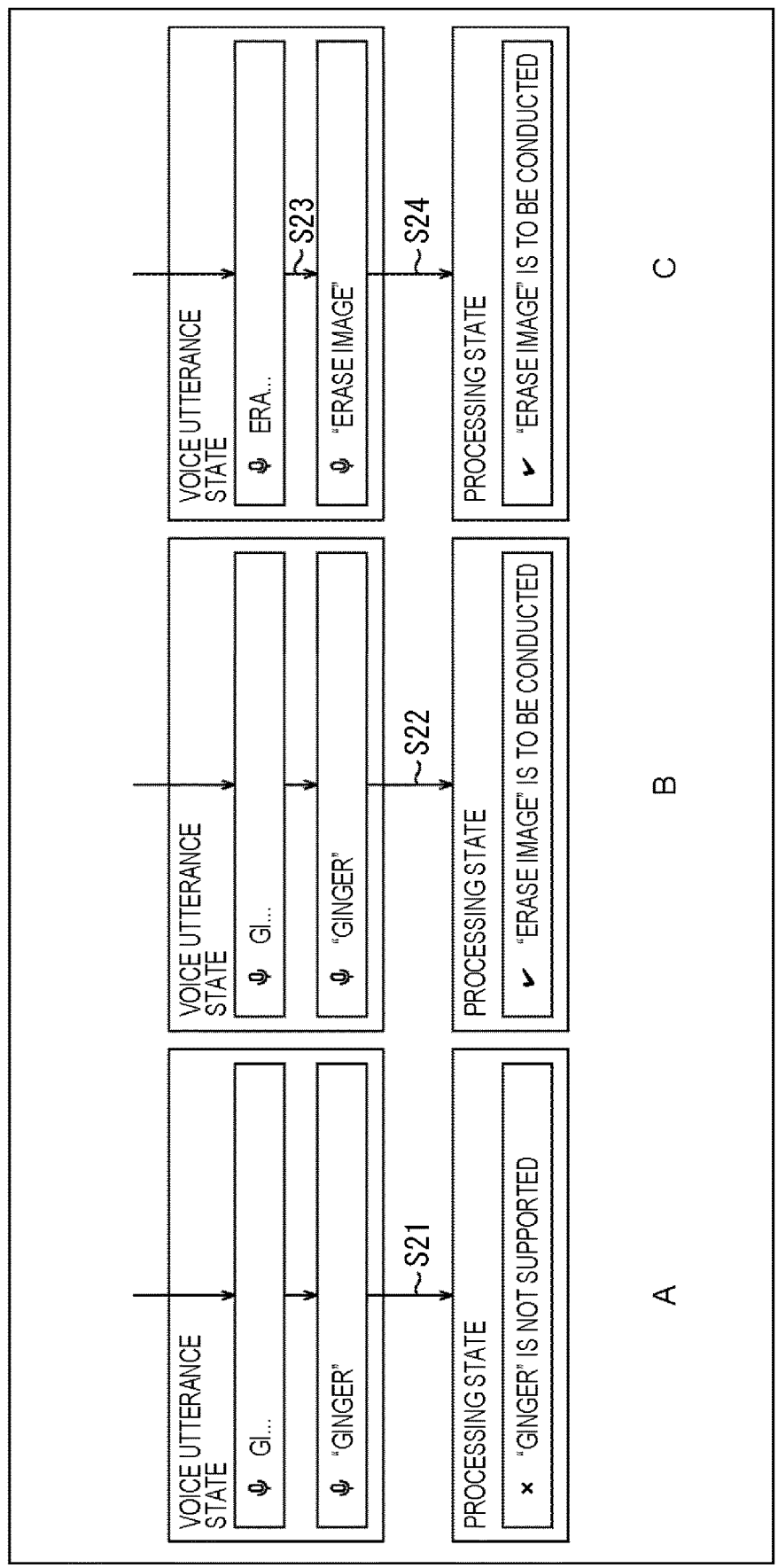
FIG. 17 is a diagram showing an example of absorbing an erroneous conversion of a voice utterance.

In this situation, on the display control device 10 side, unless the erroneous conversion is absorbed, for example, as shown in A of FIG. 17, while the user is making a voice utterance, a conversion is made into "gi . . . ", "ginger" and a command conversion is made (S21: command conversion). However, there is no command corresponding to "ginger". Therefore, for example, wording ""ginger" is not supported" is displayed in the voice operation guide 173.

In addition, in a case where on the display control device 10 side, the erroneous conversion is absorbed, for example, as shown in B of FIG. 17, while the user is making a voice utterance, a conversion is made into "gi . . . ", "ginger", and the voice utterance "ginger" is decided. However, before the command is converted, "ginger" is converted into "erase image" by referring to the internal conversion table (S22: erroneous conversion absorption). Consequently, the command corresponding to "erase image" is decided (S22: command conversion), and for example, the wording ""erase image" is to be conducted" is displayed in the voice operation guide 173.

Further, regarding the timing of referring to the internal conversion table, by referring to the internal conversion table at the time of deciding the voice utterance, not at the time of deciding the command, for example, as shown in C of FIG. 17, before the voice utterance made by the user is decided, by referring to the internal conversion table, a conversion is made into "era . . . " and "erase image" (S23: erroneous conversion absorption), and the voice utterance "erase image" is decided. Consequently, the command corresponding to "erase image" is decided (S24: command conversion). For example, wording ""erase image" is to be selected" is displayed in the voice operation guide 173. In this case, it is possible to reflect on the feedback of the utterance decision.

It is to be noted that after deciding the command, the timing of processing the command may be the same timing when the wording ""erase image" is to be conducted" or ""erase image" is to be selected" is displayed (immediate reflection) in the voice operation guide 173, or may be after a predetermined time has elapsed since the wording is displayed (time difference reflection).

Here, when the specific examples shown in A to C of FIG. 17 are compared with one another regarding the usability, the specific example of C of FIG. 17 has the highest usability, whereas the specific example of A of FIG. 17 has the lowest usability. The usability therebetween is the specific example of B of FIG. 17. Therefore, the display control device 10 refers to the internal conversion table, and performs processes of the erroneous conversion absorption and the command conversion shown in the specific example of B of FIG. 17 or C in FIG. 17.

(Example of Supporting Non-Display Area)

Figure 18:
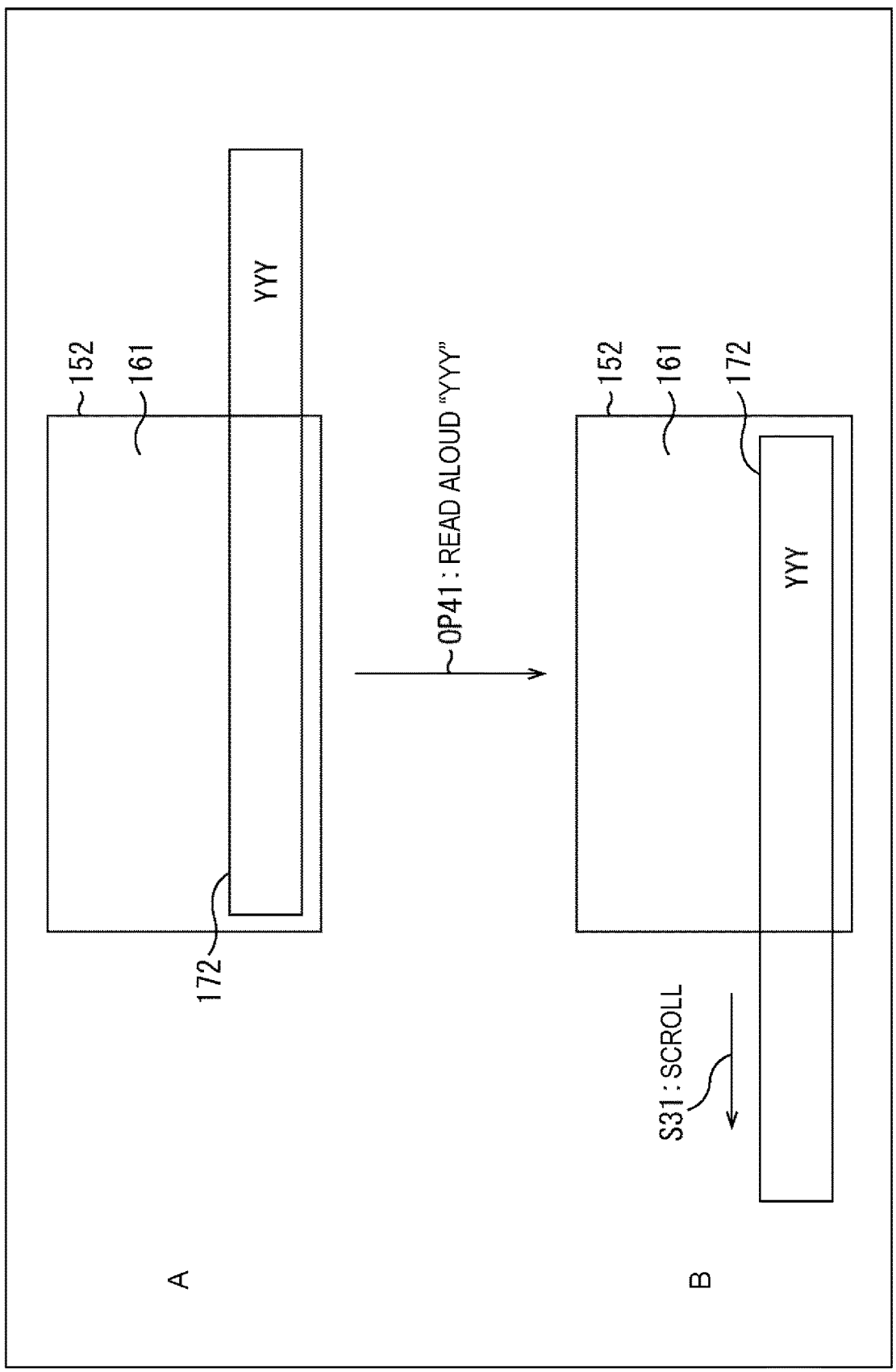
FIG. 18 is a diagram showing an example of supporting a case where an item is present in the outside of the display screen.

In the quick setting menu superimposition screen 152, by the way, in the quick setting menu 171, all items (items to be read aloud) included in the various setting items 172 are not displayed in the inside of the display screen, and some are present in the outside of the display screen in some cases, as described above. FIG. 18 shows an example of supporting a case where an item (the item to be read aloud) is present in the outside of the display screen.

Here, it is assumed that on the quick setting menu superimposition screen 152, wording "YYY" is present in the outside of the display screen (in a non-display area on the right side of the display screen), as an item included in the setting items 172 of the quick setting menu 171 displayed to be superimposed on the television program video 161 (A of FIG. 18).

In this case, when the user makes a voice utterance "YYY" (OP41), various setting items 172 of the quick setting menu 171 are scrolled on the quick setting menu superimposition screen 152 from the right to the left in the figure (S31), and the item "YYY" that has been read aloud is moved into the inside of the display screen to be displayed (B of FIG. 18).

Consequently, the user reads aloud the item (the wording "YYY" that is not displayed) included in the setting items 172 in the outside of the display screen, performs a voice operation for a setting action, and in addition, is able to visually recognize the wording that has been made by the voice utterance of the user with the item "YYY" that is scrolled into the inside of the display screen to be displayed. That is, by confirming whether the correct selection has been made for the utterance of the user, the user is able to improve the certainty in the action for the voice utterance.

In this manner, (the controller 101 of) the display control device 10 is capable of selecting an item in the inside of the display screen (a first item) or an item that becomes displayable by scrolling the outside of the display screen (a second item) in response to a voice operation performed by the user, and is capable of controlling the action in response to the selected item.

Figure 19:
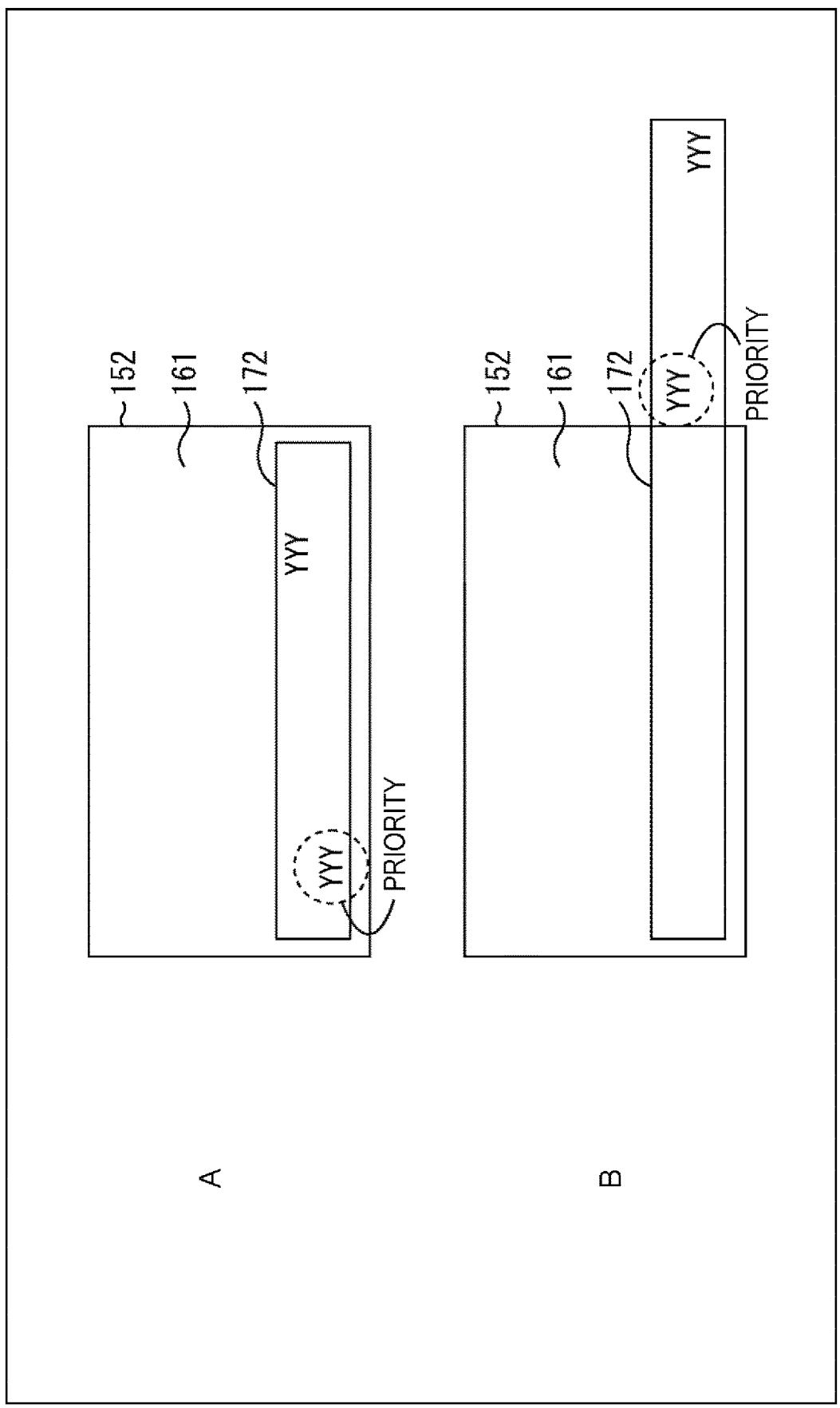
FIG. 19 is a diagram showing a first example of supporting a case where an item is present in either the inside of the display screen or the outside of the display screen.
Figure 20:
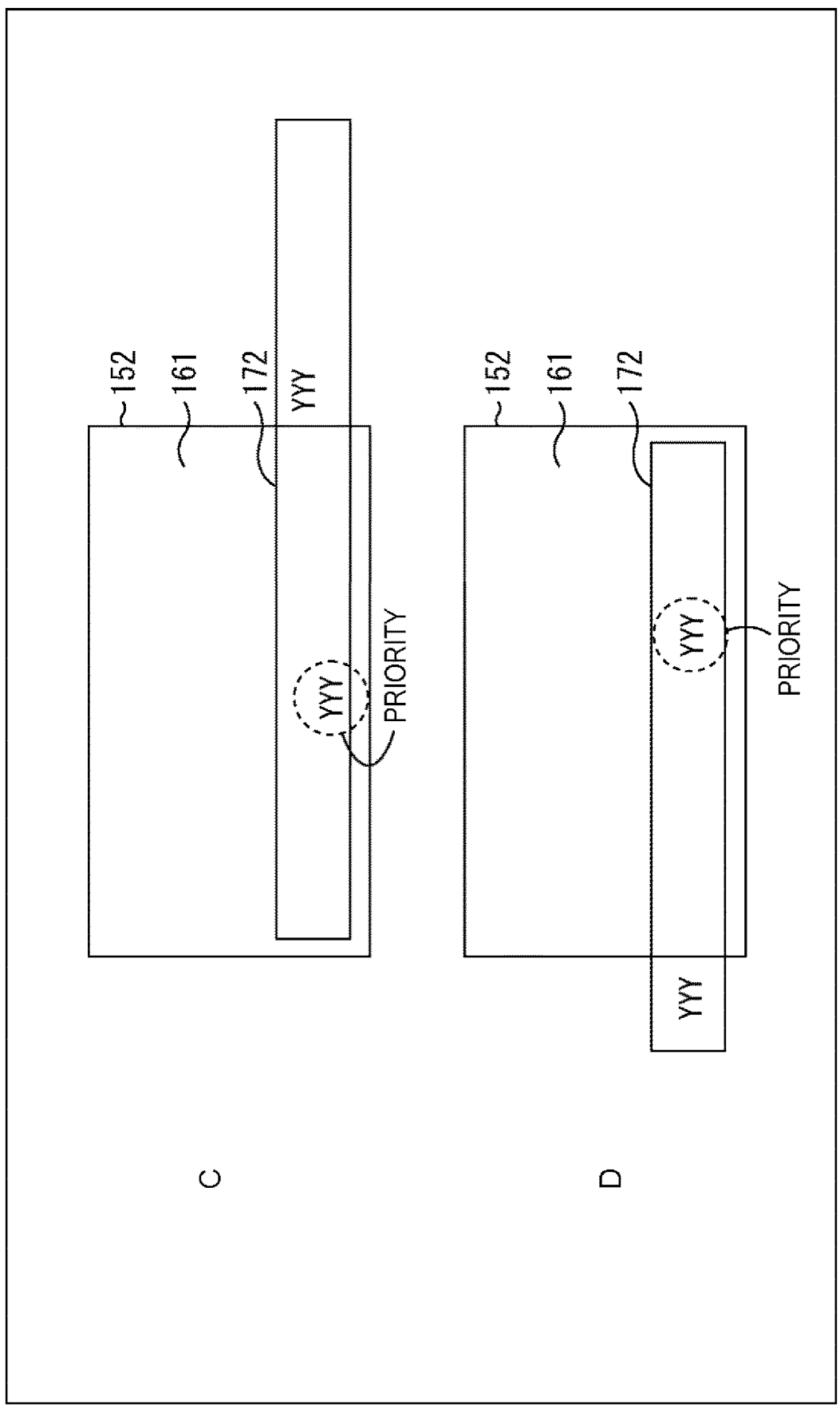
FIG. 20 is a diagram showing a second example of supporting a case where an item is present in either the inside of the display screen or the outside of the display screen.

In addition, in a case where a plurality of same items (for example, "ON" or the like) is present in at least one of the inside of the display screen or the outside of the display screen, it is sufficient if an item closest to the upper left position of the display screen is given priority. FIGS. 19 and 20 show examples of supporting a case where an item is present in the inside of the display screen or the outside of the display screen.

First, a case where a plurality of same items is present in the inside of the display screen will be described with reference to A of FIG. 19.

For example, on the quick setting menu superimposition screen 152, it is assumed that in a case where two items "YYY" are present in various setting items 172 of the quick setting menu 171 in the inside of the display screen, a voice utterance "YYY" has been made by a user (A of FIG. 19). In this situation, of the two items in the inside of the display screen, the position of an item surrounded by a broken line circle is closer to the upper left position of the display screen. Therefore, the item "YYY" on the left side is selected with priority (A of FIG. 19).

Next, a case where a plurality of same items is present in the outside of the display screen will be described with reference to B of FIG. 19.

For example, on the quick setting menu superimposition screen 152, it is assumed that in a case where two items "YYY" are present in the setting items 172 of the quick setting menu 171 in the outside of the display screen, a voice utterance "YYY" has been made by a user (B of FIG. 19). In this situation, of the two items in the outside of the display screen, the position of an item surrounded by a broken line circle is closer to the upper left position of the display screen. Therefore, the item "YYY" on the left side is selected with priority (B of FIG. 19).

Next, a case where a plurality of same items is present in the inside of the display screen and in the outside of the display screen will be described with reference to C of FIG. 20 and D of FIG. 20.

For example, on the quick setting menu superimposition screen 152, it is assumed that in a case where items "YYY" are respectively present in the setting items 172 in both the inside of the display screen and the outside of the display screen, a voice utterance "YYY" has been made by a user (C of FIG. 20). In this situation, of the two items in the inside of the display screen and the outside of the display screen, the position of an item in the inside of the display screen surrounded by a broken line circle is closer to the upper left position of the display screen. Therefore, the item "YYY" on the left side is selected with priority (C of FIG. 20).

Further, for example, on the quick setting menu superimposition screen 152, it is assumed that in a case where the item "YYY" is present in the setting items 172 in both the inside of the display screen and the outside of the display screen, a voice utterance "YYY" has been made by a user (D of FIG. 20). In this situation, of the two items in the inside of the display screen and the outside of the display screen, the position of an item surrounded by a broken line circle is farther from the upper left position of the display screen, but is present in the inside of the display screen. Therefore, the item "YYY" on the right side is selected with priority (D of FIG. 20).

In other words, in this situation, the position of the item "YYY" in the outside of the display screen is closer to the upper left position of the display screen, but the item "YYY" in the inside of the display screen is given priority over the position in the outside of the display screen. That is, in the case where the items are present in both the inside of the display screen and the outside of the display screen, a first condition of giving priority to the item in the inside of the display screen over the item in the outside of the display screen is firstly applied, and then a second condition of giving priority to the item closer to the upper left position of the display screen is applied.

It is to be noted that in FIG. 19 and FIG. 20, the case where the same two items are present has been described. However, in a similar manner, even in a case where three or more same items are present, while giving priority to the item in the inside of the display screen over the item in the outside of the display screen, selection of the item that is present closer to the upper left position of the display screen is enabled with priority.

Next, a flow of an item selection process performed by the display control device 10 will be described with reference to flowcharts of FIGS. 21 and 22.

Figure 21:
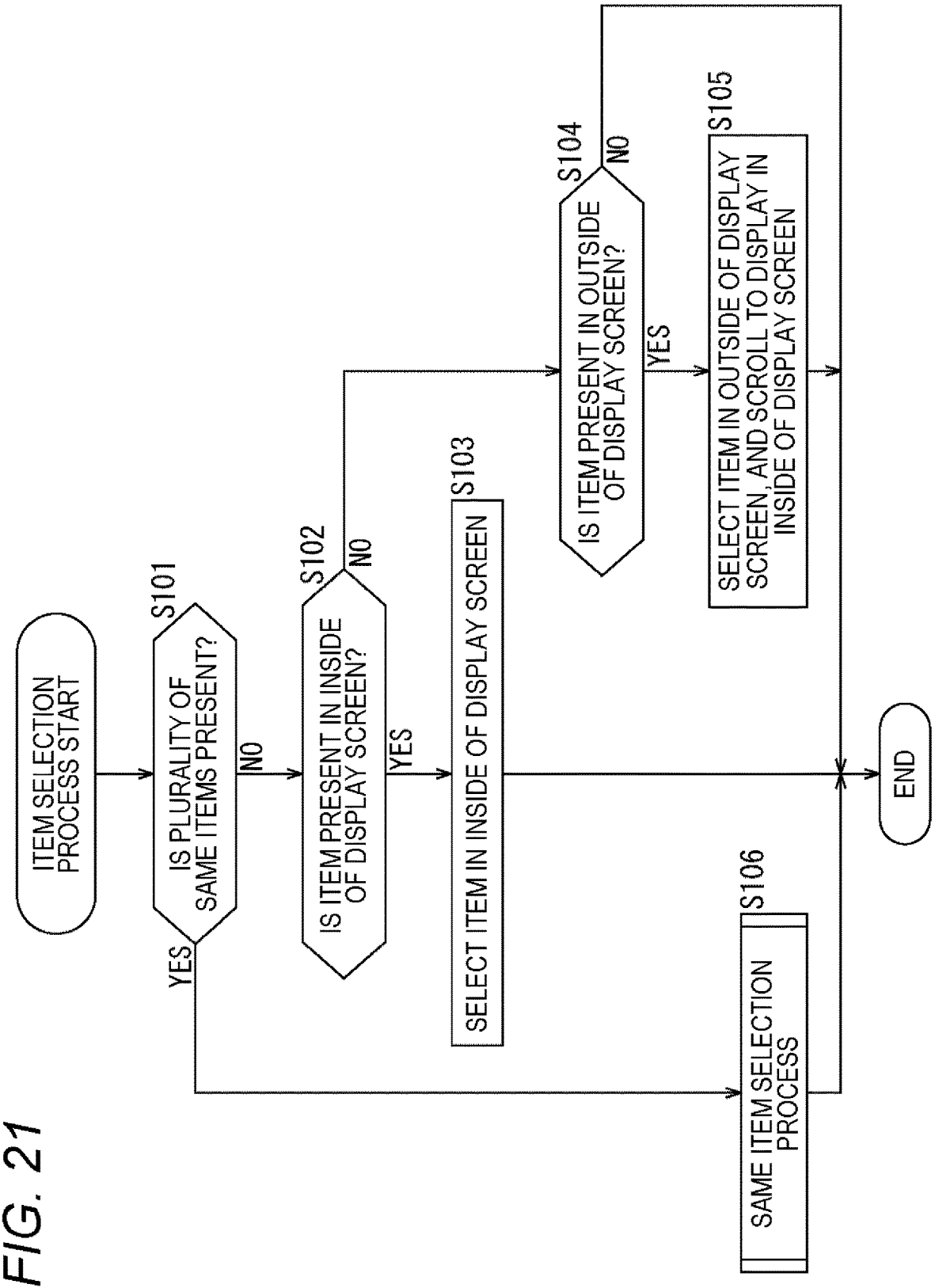
FIG. 21 is a flowchart for describing a flow of an item selection process.
Figure 22:
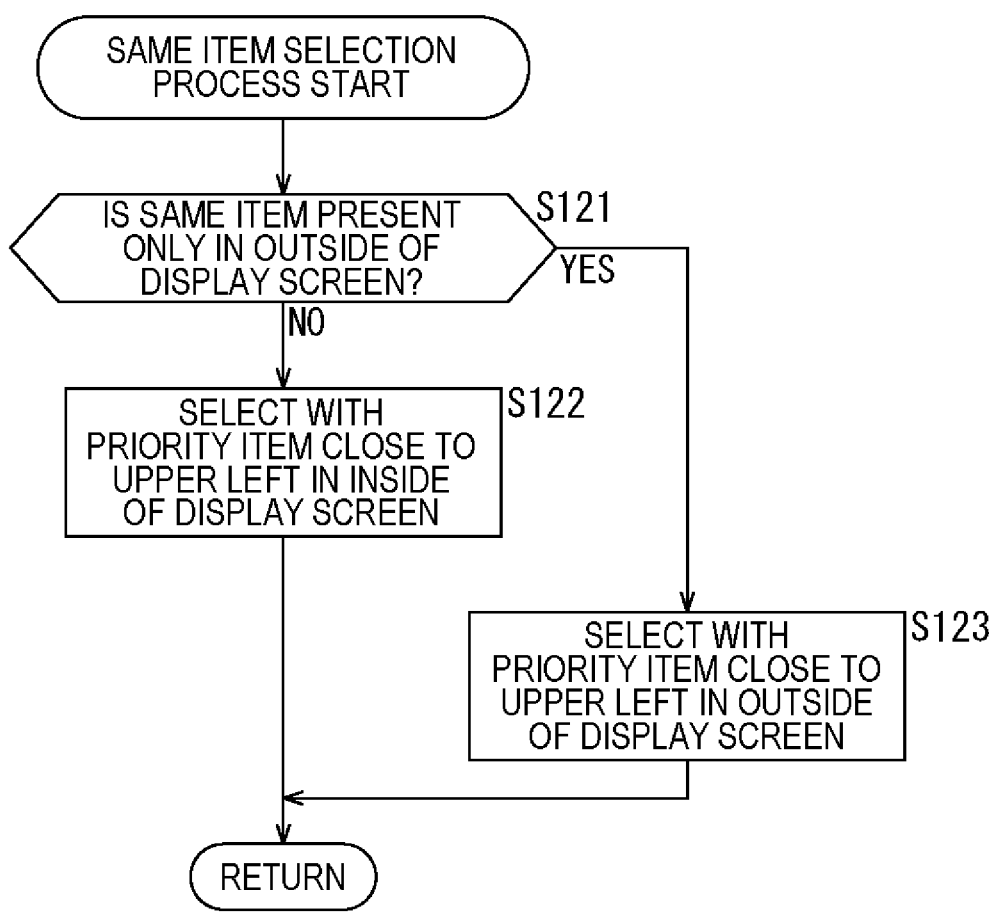
FIG. 22 is a flowchart for describing a flow of a same item selection process.

It is to be noted that the item selection process shown in FIG. 21 is performed when a user makes a voice utterance.

In step S101, the controller 101 determines whether a plurality of the same items is present on the basis of a recognition result of the voice utterance made by the user.

In a case where it is determined in step S101 that only one item is present, the process proceeds to step S102. In step S102, the controller 101 determines whether the item is present in the inside of the display screen.

In a case where it is determined in step S102 that the item is present in the inside of the display screen, the process proceeds to step S103. In step S103, the controller 101 selects the item in the inside of the display screen. Then, the controller 101 controls an action in response to the selected item.

On the other hand, in a case where it is determined in step S102 that the item is not present in the inside of the display screen, the process proceeds to step S104. In step S104, the controller 101 determines whether the item is present in the outside of the display screen.

In a case where it is determined in step S104 that the item is present in the outside of the display screen, the process proceeds to step S105. In step S105, the controller 101 selects the item in the outside of the display screen, and scrolls the selected item to display the selected item in the inside of the display screen (for example, the specific examples of A of FIG. 18 and B of FIG. 18). Then, the controller 101 controls an action in response to the selected item.

It is to be noted that in a case where it is determined in step S104 that the item is not present in the outside of the display screen, the item selection process ends because the item is not present in either the inside of the display screen or the outside of the display screen.

In addition, in a case where it is determined in step S101 that a plurality of same items is present, the process proceeds to step S106. In step S106, the controller 101 performs a same item selection process. The details of the same item selection process are shown in the flowchart of FIG. 22.

That is, in step S121, the controller 101 determines whether the same item is present only in the outside of the display screen.

In a case where it is determined in step S121 that the same item is also present in the inside of the display screen, the process proceeds to step S122. In step S122, the controller 101 selects with priority the item that is present at a position closest to the upper left position (the reference position) of the display screen in the inside of the display screen (for example, the specific examples of A of FIG. 19, A of FIG. 20, and B of FIG. 20). Then, the controller 101 controls an action in response to the selected item.

On the other hand, in a case where it is determined in step S121 that the same item is present only in the outside of the display screen, the process proceeds to step S123. In step S123, the controller 101 selects with priority an item that is present at the position closest to the upper left position (the reference position) of the display screen in the outside of the display screen (for example, the specific example of B of FIG. 19). In addition, the controller 101 controls an action in response to the selected item.

In a case where the process of step S122 or S123 is completed, the process is returned to step S106 of FIG. 21, and the item selection process ends.

Heretofore, the flow of the item selection process has been described.

(Example of Reduced Display of Item)

In the above description, as the second item to be selected (the item in the outside of the display screen), the item that becomes displayable by scrolling (FIG. 18) has been described. However, the item that becomes displayable in another method may be selected without limiting to the scrolling. For example, FIG. 23 shows an example in which the item that becomes displayable by reducing the size of the item is selected as the second item (the item in the outside of the display screen).

Figure 23:
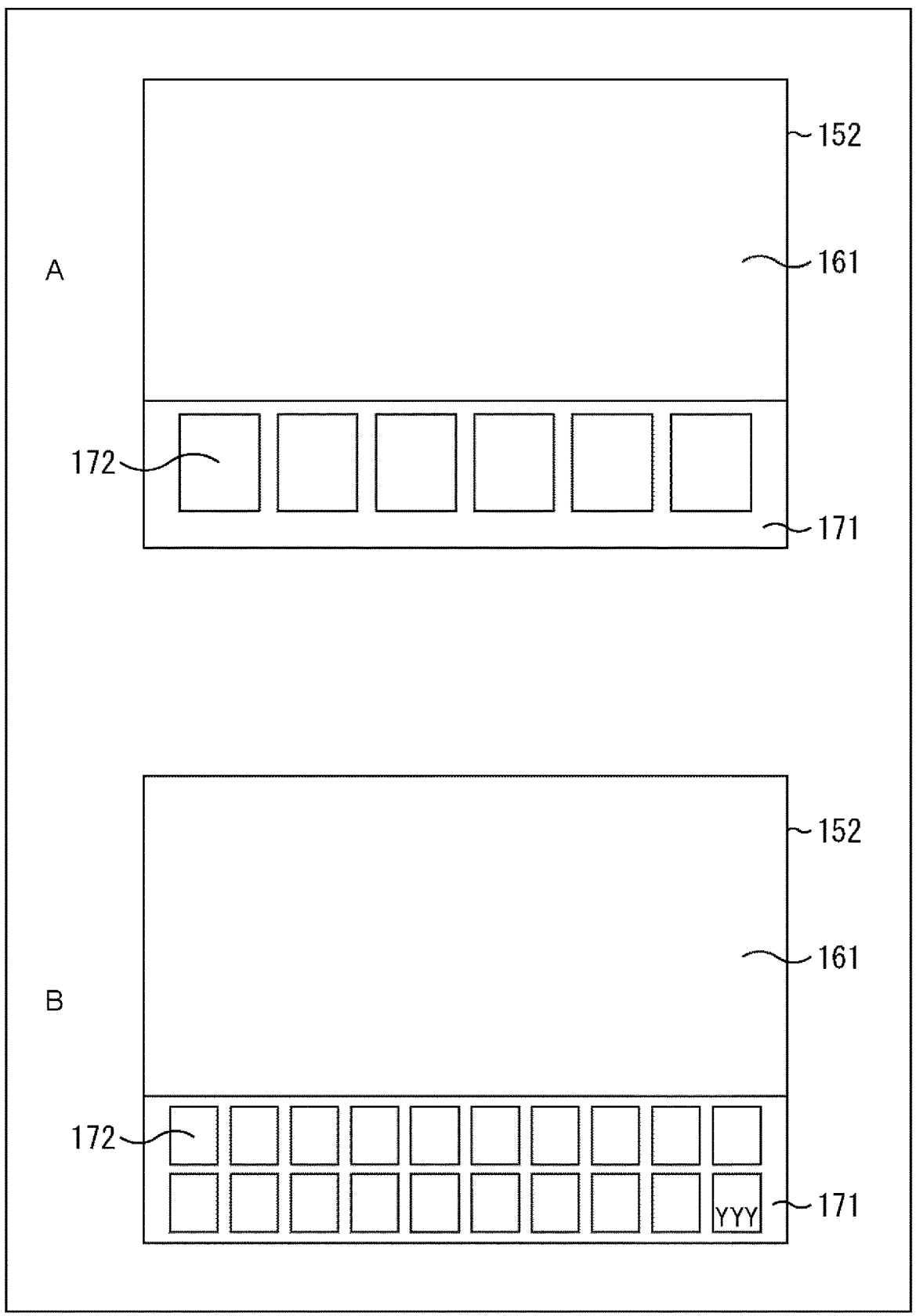
FIG. 23 is a diagram showing an example of reducing the size of an item.

Here, on the quick setting menu superimposition screen 152, it is assumed that a case where only parts of the setting items 172 are displayed among the plurality of setting items 172, which is included in the quick setting menu 171 and which is displayed to be superimposed on the television program video 161 (A of FIG. 23).

In this case, when the user makes a voice utterance "YYY", the size of each setting item 172 is reduced in the quick setting menu 171. The number of the setting items 172, which are being displayed, is increased from six (6×1 line) to 20 (10×2 lines), so that the item "YYY", which has been read aloud, is displayed in the inside of the display screen (B of FIG. 23).

In this situation, when the quick setting menu superimposition screen 152 of B of FIG. 23 is compared with the quick setting menu superimposition screen 152 of A of FIG. 23, the size itself of the area of the quick setting menu 171 has not changed. However, as the size of each setting item 172 is reduced, a larger number of setting items 172 are displayed.

Consequently, the user reads aloud the item (the wording "YYY" that is not displayed) included in the setting items 172 in the outside of the display screen, and performs the voice operation for a setting action. In addition, the user is able to visually recognize the wording that the user has made a voice utterance with the item "YYY", which is reduced in size and which is displayed in the inside of the display screen. That is, by confirming whether the correct selection has been made for the utterance of the user, the user is able to improve the certainty in the action for the voice utterance.

In this manner, (the controller 101 of) the display control device 10 selects the item in the inside of the display screen (the first item) or the item that becomes displayable by reducing the size (size) of the item in the outside of the display screen (the second item) in response to the voice operation performed by the user, and is capable of controlling the action in response to the selected item.

(Example of Enlarged Display of Area)

Figure 24:
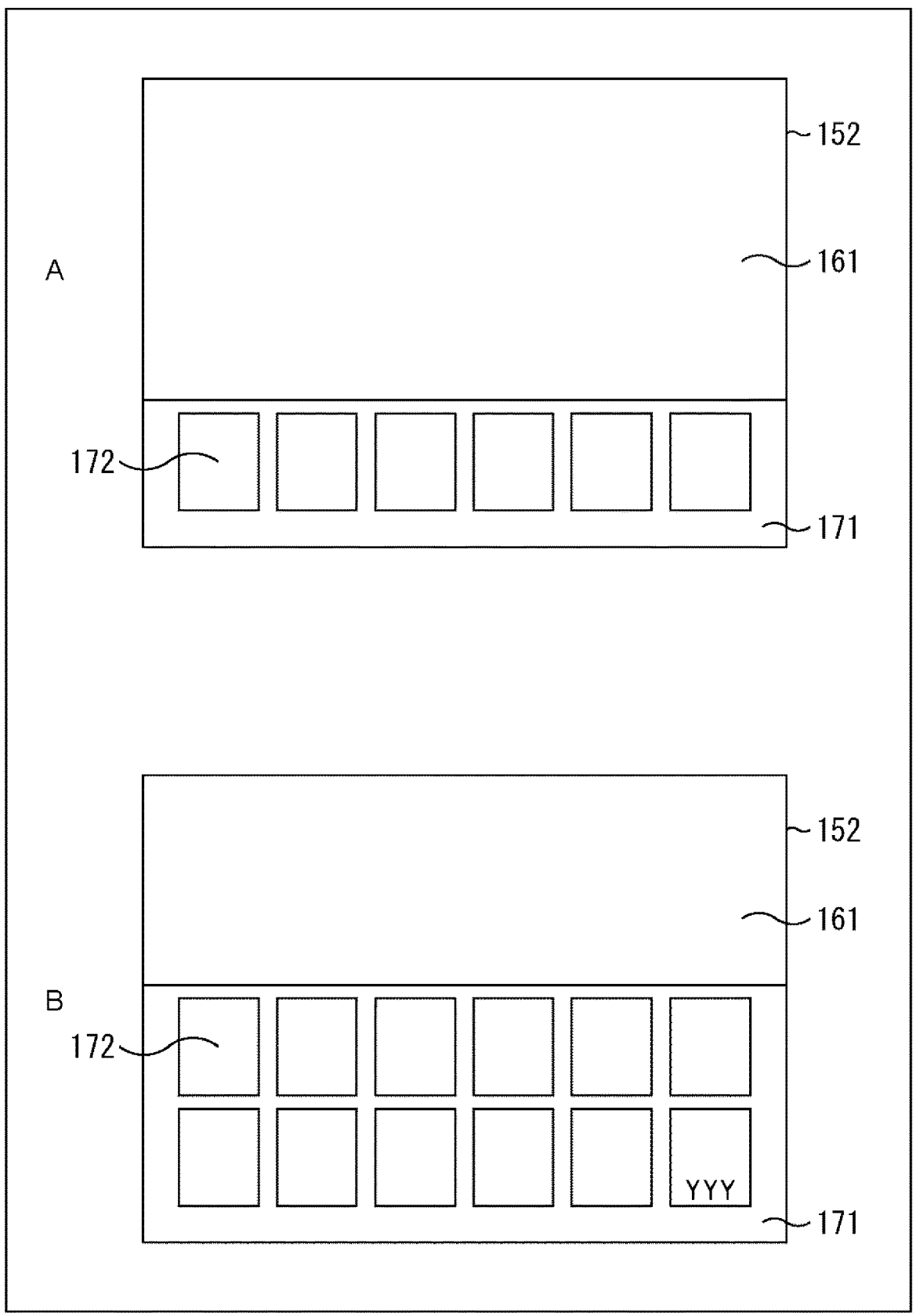
FIG. 24 is a diagram showing an example of enlarging the display area of an item.

Further, for example, FIG. 24 shows an example in which an item that becomes displayable by enlarging the area for displaying the item is selected as the second item (an item in the outside of the display screen).

Here, on the quick setting menu superimposition screen 152, it is assumed that a case where only parts of the setting items 172 are displayed among the plurality of setting items 172 included in the quick setting menu 171 (A of FIG. 24).

In this case, when the user makes a voice utterance "YYY", an area (an area for displaying the items) in the quick setting menu 171, which is superimposed on the television program video 161, is enlarged on the quick setting menu superimposition screen 152. The number of the setting items 172, which are being displayed, is increased from six (6×1 line) to 12 (6×2 lines), so that the item "YYY", which has been read aloud, is displayed in the inside of the display screen (B of FIG. 24).

In this situation, when the quick setting menu superimposition screen 152 of B of FIG. 24 is compared with the quick setting menu superimposition screen 152 of A of FIG. 24, the size itself of each setting item 172 has not changed. However, as the area of the quick setting menu 171 is enlarged, a larger number of setting items 172 are displayed.

Consequently, the user reads aloud the item (the wording "YYY" that is not displayed) included in the setting items 172 in the outside of the display screen, and performs the voice operation for a setting action. In addition, the user is able to visually recognize the wording that the user has made a voice utterance with the item "YYY", which is enlarged in size and which is displayed in the inside of the display screen. That is, by confirming whether the correct selection has been made for the utterance of the user, the user is able to improve the certainty in the action for the voice utterance.

In this manner, (the controller 101 of) the display control device 10 is capable of selecting the item in the inside of the display screen (the first item) or the item that becomes displayable by enlarging the area (an item display area) for displaying the item in the outside of the display screen (the second item) in response to the voice operation performed by the user, and is capable of controlling the action in response to the selected item.

It is to be noted that here, in addition to the scrolling shown in FIG. 18, the example of FIG. 23 (an example of reducing the size of the item) and the example of FIG. 24 (an example of enlarging the display area of an item) have been described as examples of selecting the second item (the item in the outside of the display screen) as the item that is displayable. However, the point is that it is sufficient if the item in the outside of the display screen is to be displayed in the inside of the display screen, and another method may be used as long as the item in the outside of the display screen becomes displayable. For example, in combination of the example of FIG. 23 and the example of FIG. 24 to reduce the size of the item and enlarge the display area of the item, a desired item may be selected and displayed from a larger number of the items.

Further, in the example of FIG. 23 and the example of FIG. 24, the quick setting menu 171 of the quick setting menu superimposition screen 152 has been described as an example. However, regarding the input switching menu 181 of the input switching menu superimposition screen 153 or the television menu 191 of the television menu superimposition screen 154, a similar item selection is available according to a content of a menu.

(Example of Hierarchical Menu)

Figure 25:
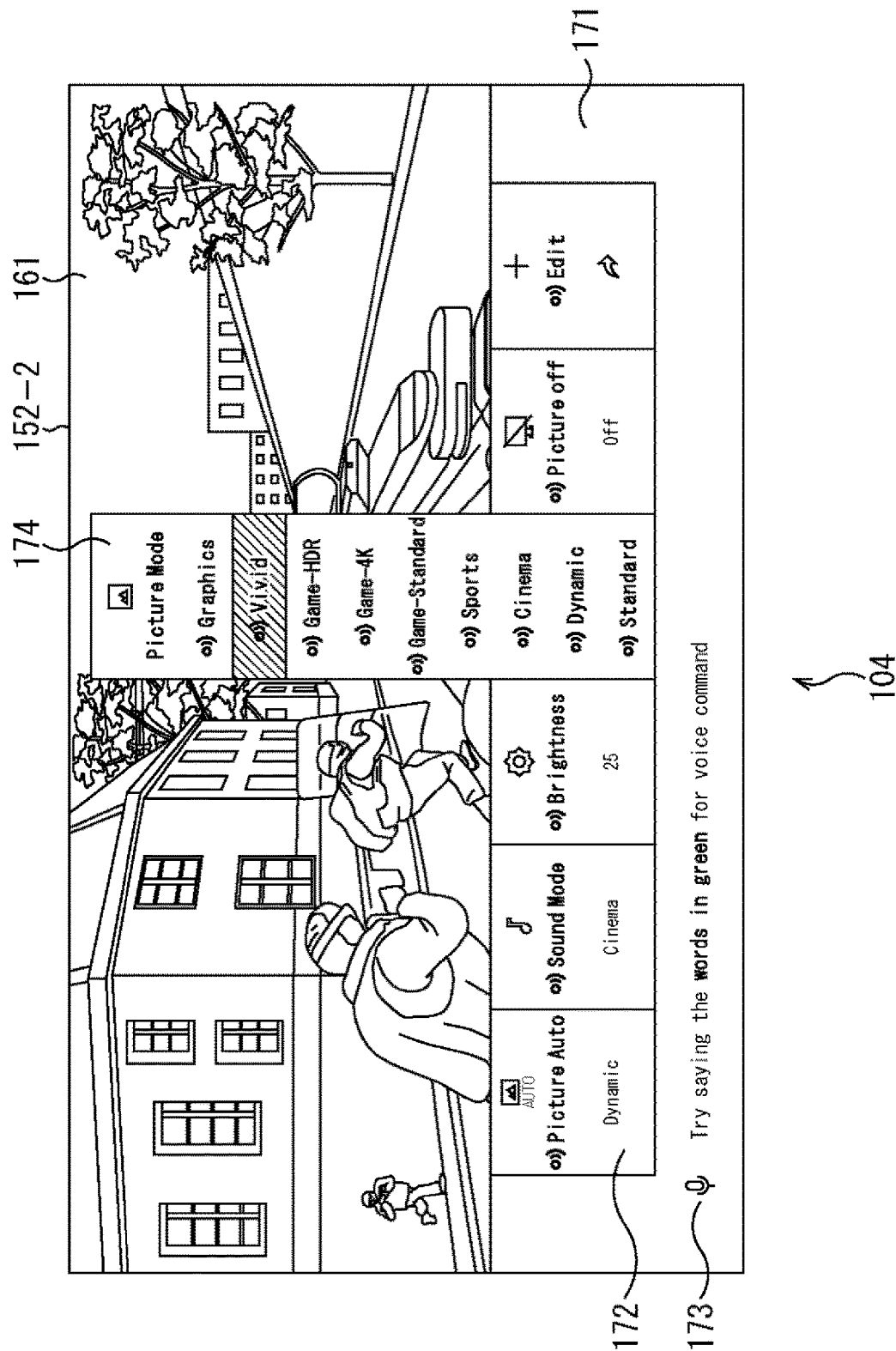
FIG. 25 is a diagram showing an example of displaying the quick setting menu superimposition screen.

FIG. 25 shows an example of displaying the quick setting menu superimposition screen 152.

In the quick setting menu superimposition screen 152, various setting items 172 are arranged in the quick setting menu 171 in the horizontal direction of the display screen. As such setting items 172, for example, the setting items (the items), such as Picture Auto to which "Dynamic" is set, Sound Mode to which "Cinema" is set, Brightness to which "25" is set, Picture Mode to which "Off" is set, Picture off to which "Off" is set, are displayed.

Here, in a case where the user selects a desired setting item from the various setting items 172 displayed on the quick setting menu 171, a setting value 174 corresponding to the setting item that has been selected is displayed.

Specifically, in a case where a voice utterance in "picture mode" is made as the desired setting item, the setting items in the picture mode of the various setting items 172 in the quick setting menu 171 extend in the vertical direction of the display screen, and the setting values 174 corresponding to the picture mode are displayed. As such a setting value 174, parameters (the items) related to the picture modes, for example, "Graphics", "Vivid", "Game-HDR", "Game-4K", "Game-Standard", "Sports", "Cinema", "Dynamic", and "Standard" are respectively displayed with icons.

Consequently, the user is able to select a desired setting value (the item) from the setting values 174 related to the picture mode that has been selected as the desired setting item (the item). Specifically, for example, in a case where the user makes a voice utterance "Vivid (vivid)", the display control device 10 performs a setting action for setting "Vivid" as the picture mode.

Figure 26:
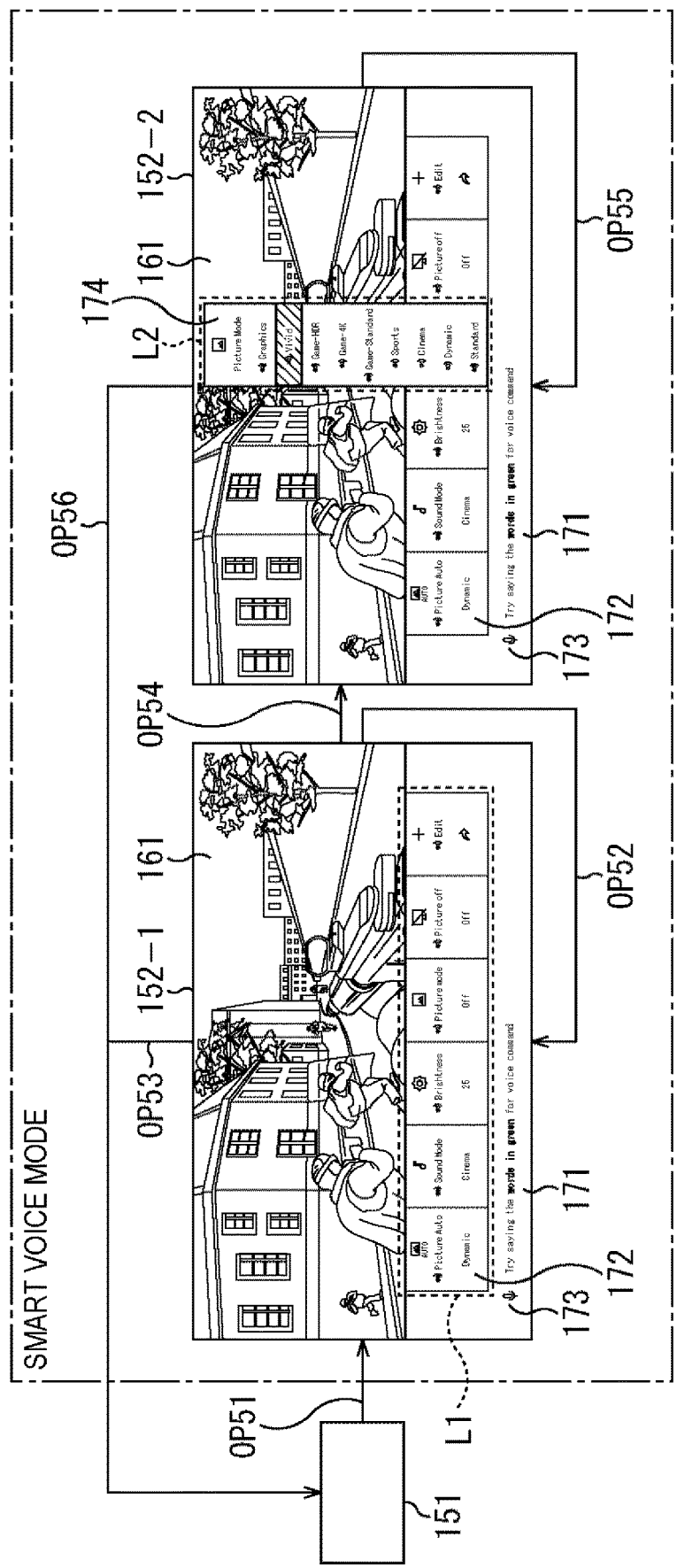
FIG. 26 is a diagram showing an example of displaying a hierarchical menu in a quick setting menu.

FIG. 26 shows an example of a transition of the hierarchical menu in the smart voice mode.

In the display control device 10, in a case where the user makes a voice utterance "Service XXX, quick setting" in the remote control operation mode (OP51), the action mode transits to the smart voice mode, and the quick setting menu superimposition screen 152-1 is displayed. In such a quick setting menu superimposition screen 152-1, the various setting items 172 are displayed as a first layer L1 of the quick setting menu 171, in the horizontal direction of the display screen.

In this situation, the user is able to perform various voice operations with respect to the items included in the item display area in the quick setting menu 171 (OP52).

Here, for example, a voice operation or the like for scrolling the setting item 172 as the first layer L1 can be performed. Further, for example, in a case where a voice operation of "close" for giving an instruction on the end of the quick setting menu 171 or a voice operation for carrying out a predetermined function is performed (OP53), the quick setting menu 171 ends, and the action mode transitions to the remote control operation mode.

Further, for example, in a case where the user makes a voice utterance in the "picture mode" (OP54), the quick setting menu superimposition screen 152-2 is displayed. In such a quick setting menu superimposition screen 152-2, the setting item in the picture mode that has been selected extends as a second layer L2 of the quick setting menu 171 in the vertical direction of the display screen, and the setting value 174 related to picture mode is displayed in the vertical direction of the display screen.

In this situation, the user is able to perform various voice operations with respect to the items included in the item display area in the quick setting menu 171 (OP55).

Here, for example, in a case where a voice operation of "close" for giving an instruction on the end of the quick setting menu 171 or a voice operation for carrying out a predetermined function is performed (OP56), the quick setting menu 171 ends, and the action mode transitions to the remote control operation mode. Further, for example, in a case where the user makes a voice utterance "Vivid" (OP55), the display control device 10 performs a setting action for setting "Vivid" as the picture mode (OP56).

In this manner, in the quick setting menu 171, a hierarchical menu is achieved with the first layer L1 including the various setting items 172 such as the picture auto and the picture mode displayed in the horizontal direction of the display screen, and the second layer L2 including the various setting values 174 such as "Graphics" and "Vivid" displayed in the vertical direction (a direction orthogonal to the horizontal direction) of the display screen. Then, one or a plurality of first layer items included in the setting items 172 in the first layer L1 and one or a plurality of second layer items included in the setting values 174 in the second layer L2 are present as the items to be read aloud.

On such a hierarchical menu, (a second layer item included in) the various setting values 174 that can be set for (a first layer item included in) the desired setting item 172 that has been selected from among (the first layer item included in) the various setting items 172 displayed as the first layer L1 are displayed as the second layer L2. Therefore, the user is able to select a desired setting value (the item), while comparing the various setting values 174 displayed in the second layer L2.

It is to be noted that even in a case where the setting value 174 that can be set in the desired setting item 172 that has been selected is displayed as the second layer L2, another setting item 172 in the first layer L1 is selectable. On the other hand, in a case where only (the first layer item included in) the various setting items 172 in the first layer L1 are displayed, (the second layer item included in) the various setting values 174 in the second layer L2, which are a non-display item (the second layer item), are not selectable. Consequently, the selection of an erroneous item with respect to the voice utterance that has been made by the user can be prevented.

For example, in the example of FIG. 26, the first layer item in the picture mode is selected as the setting item 172 in the first layer L1, and the second layer item related to the picture mode is being displayed as the setting value 174 in the second layer L2. In such a state, for example, in a case where the user makes a voice utterance in the "sound mode", the selection of the setting item 172 in the first layer L1 is changed from the picture mode to the first layer item in the sound mode, and the second layer items (for example, Cinema, News, Sports, Music, Game, and the like) related to the sound mode are displayed as the setting values 174 in the second layer L2.

On the other hand, in the state of such an example, one or a plurality of second layer items corresponding to other first layer items that are not selected as the setting item 172 in the first layer L1 (one or a plurality of second layer items corresponding to unselected first layer items), that is, even when an utterance regarding the non-display setting value 174 as the second layer L2 is made, the setting value corresponding to the voice utterance is not selectable. Consequently, selection of an erroneous item for the voice utterance that has been made by the user can be prevented, and at the same time, selection of another setting item in the first layer L1 is easily enabled, and the operability of the user can be improved.

Further, in the second layer L2, the currently selected setting value (the second layer item) from among the various setting values 174 that are displayed is displayed to be identifiable. For example, as indicated by hatching in the second layer L2, in the case where "Vivid" is selected as the setting value in the picture mode, the setting value that is currently selected is identified by moving the cursor to the setting value "Vivid".

Next, a flow of a quick setting menu operation support process performed by the display control device 10 will be described with reference to a flowchart of FIG. 27.

Figure 27:
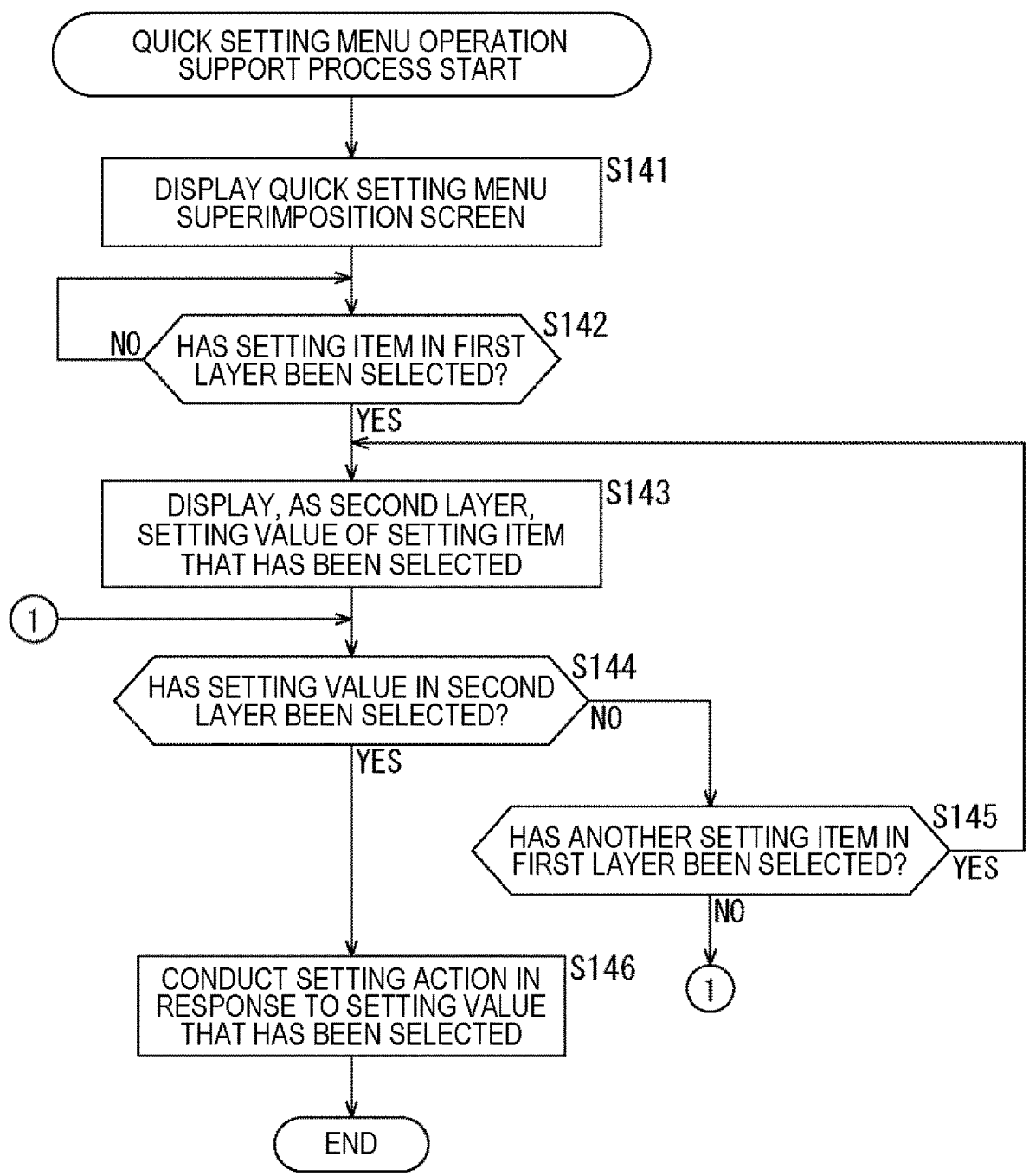
FIG. 27 is a flowchart for describing a flow of a quick setting menu operation support process.

It is to be noted that the quick setting menu operation support process in FIG. 27 is performed when a user makes a voice utterance.

In step S141, when the user makes a voice utterance "Service XXX, quick setting", the controller 101 displays the quick setting menu superimposition screen 152-1 on the display unit 104.

In step S142, the controller 101 determines whether the user has made a voice utterance of a first layer item such as "picture mode", and has selected (a first layer item included in) a setting item 172 of the first layer L1 in the quick setting menu 171.

In a case where it is determined in step S142 that the setting item 172 of the first layer L1 has not been selected, the determination process of step S142 is repeated. In addition, in a case where it is determined in step S142 that the setting item 172 of the first layer L1 has been selected, the process proceeds to step S143.

In step S143, the controller 101 displays the setting value 174 of the setting item 172, which has been selected, of the first layer L1, as the second layer L2. Consequently, the display unit 104 displays, as the second layer L2, for example, the quick setting menu superimposition screen 152-2 on which the setting value 174 related to the picture mode is superimposed.

In step S144, the controller 101 determines whether the user has made a voice utterance of a second layer item such as "vivid", and has selected (the second layer item included in) the setting value 174 of the second layer L2 in the quick setting menu 171.

In a case where it is determined in step S144 that the setting value 174 of the second layer L2 is not selected, the process proceeds to step S145. In step S145, the controller 101 determines whether the user has made a voice utterance of another first layer item such as "sound mode", and has selected another setting item 172 of the first layer L1.

In a case where it is determined in step S145 that another setting item 172 of the first layer L1 is not selected, the process returns to step S144, and the determination process of step S144 is repeated. In a case where it is determined in step S145 that another setting item 172 of the first layer L1 has been selected, the process returns to step S143, and the processes of step S143 and subsequent steps are repeated. That is, in this case, for example, on the quick setting menu superimposition screen 152-2, the setting value 174 related to the sound mode is displayed as the second layer L2.

On the other hand, in a case where it is determined in step S144 that the setting value 174 of the second layer L2 has been selected, the process proceeds to step S146.

In step S146, the controller 101 conducts a setting action corresponding to the setting value 174 of the second layer L2 that has been selected. Here, for example, the setting action for setting "Vivid" as the picture mode is performed. Then, when the process of step S146 ends, the quick setting menu operation support process ends.

Heretofore, the flow of the quick setting menu operation support process has been described.

(Example of Overall Panoramic View Image)

Figure 28:
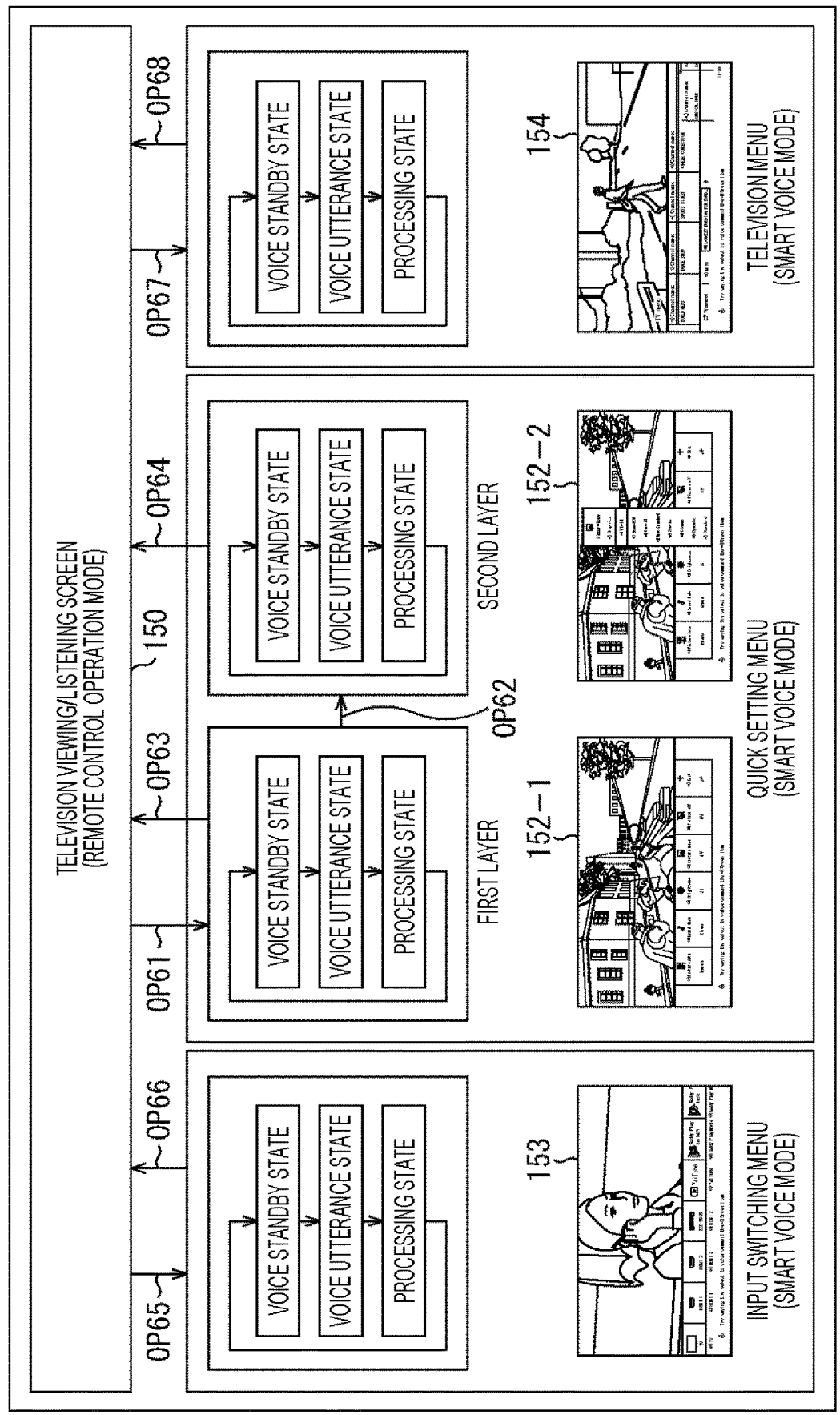
FIG. 28 is a diagram showing an example of an overall panoramic view image related to actions of the display control device.

FIG. 28 shows an example of an overall panoramic view image related to actions of the display control device 10.

In displaying the television viewing/listening screen 150, the display control device 10 acts in the remote control operation mode, whereas in displaying the quick setting menu superimposition screen 152, the input switching menu superimposition screen 153, and the television menu superimposition screen 154, the display control device 10 acts in the smart voice mode.

In a case where the voice utterance "Service XXX, quick setting" is made when the television viewing/listening screen 150 is displayed (OP61), the quick setting menu superimposition screen 152 (152-1) is displayed in the display control device 10.

On the quick setting menu superimposition screen 152, the quick setting menu 171 has a hierarchical menu structure. In a case where the setting item 172 of the first layer L1 is selected (OP62), the setting value 174 of the second layer L2 is displayed. In the display control device 10, while the setting item 172 of the first layer L1 is being displayed as the quick setting menu 171 or the setting value 174 of the second layer L2 is being displayed together with the setting item 172 of the first layer L1, the transitions among the three states that are the voice standby state, the voice utterance state, and the processing state are repeated, and a command in response to the voice utterance can be processed.

It is to be noted that when the quick setting menu superimposition screen 152 (152-1, 152-2) is displayed, in a case where a voice utterance "close" is made, a predetermined function is performed, or a remote control operation is performed (OP63, OP64), the superimposition of the quick setting menu 171 is canceled, and the display is switched to the television viewing/listening screen 150.

Further, in the display control device 10, when the television viewing/listening screen 150 is displayed, in a case where the voice utterance "Service XXX, input switching" is made (OP65), the input switching menu superimposition screen 153 is displayed. In the display control device 10, when the input switching menu superimposition screen 153 is displayed, the transitions among the three states that are the voice standby state, the voice utterance state, and the processing state are repeated, and a command in response to the voice utterance can be processed.

It is to be noted that when the input switching menu superimposition screen 153 is displayed, in a case where a voice utterance "close" is made, a predetermined function is performed, or a remote control operation is performed (OP66), the superimposition of the input switching menu 181 is canceled, and the display is switched to the television viewing/listening screen 150.

Further, in the display control device 10, when the television viewing/listening screen 150 is displayed, in a case where a voice utterance "Service XXX, television menu" is made (OP67), the television menu superimposition screen 154 is displayed. In the display control device 10, when the television menu superimposition screen 154 is displayed, the transitions among the three states that are the voice standby state, the voice utterance state, and the processing state are repeated, and a command in response to the voice utterance can be processed.

It is to be noted that when the television menu superimposition screen 154 is displayed, in a case where a voice utterance "close" is made, a predetermined function is performed, or a remote control operation is performed (OP68), the superimposition of the television menu 191 is canceled, and the display is switched to the television viewing/listening screen 150.

Further, in the display control device 10, the voice operation at the time of doing the remote control operation mode action is achieved by transitioning to the agent mode, and is managed by a service provider that provides the platform of the voice AI assistant service. On the other hand, in the display control device 10, the voice operation at the time of doing the smart voice mode action is managed by a manufacturer that designs and manufactures the display control device 10 such as the television receiver.

2. Modification Example

In the above description, the display control device 10 has been described as a television receiver. However, without limiting thereto, for example, electronic devices such as display devices, personal computers, tablet terminals, smartphones, mobile telephones, head mounted displays, and game machines may be applicable.

Further, in the above description, the display control device 10 has been described as the television receiver including a display unit such as a liquid crystal display unit or an OLED display unit. However, the display control device 10 may be configured without the provision of the display unit 104. As the display control device 10 without the provision of the display unit 104, for example, electronic devices such as a set-top box, a recorder, and a reproducing device (a player) are included.

Further, in the above description, the case where the user performs the remote control operation or the voice operation as the operation for the display control device 10 has been described. However, without limiting thereto, for example, a camera unit is provided for the display control device 10, so that a gesture operation or the like may be performed by analyzing a captured image obtained by capturing an image of a user who makes a predetermined gesture. Furthermore, without limiting to the short-range wireless communication or infrared communication, the display control device 10 and the remote controller 11 may perform communication according to another communication method. The communication method here, without limiting to the wireless communication, may be wired communication.

3. Computer Configuration

The series of processes described above (for example, the item selection process of FIG. 21 and the quick setting menu operation support process of FIG. 27) can be performed by hardware or software. In a case where the series of processes is performed by software, a program constituting the software is installed on a computer of each device. FIG. 29 is a block diagram showing a configuration example of hardware of a computer that performs the series of processes described above with a program.

In the computer 1000, a central processing unit (CPU) 1001, a read only memory (ROM) 1002, and a random access memory (RAM) 1003 are connected with each other by a bus 1004. An input and output interface 1005 is further connected with the bus 1004. An input unit 1006, an output unit 1007, a storage unit 1008, a communication unit 1009, and a drive 1010 are connected with the input and output interface 1005.

The input unit 1006 includes a microphone, a keyboard, a mouse, and the like. The output unit 1007 includes a speaker, a display, and the like. The storage unit 1008 includes a hard disk, a non-volatile memory, and the like. The communication unit 1009 includes a network interface and the like. The drive 1010 drives a removable storage medium 1011 such as a magnetic disk, an optical disk, a magneto-optical disk, or a semiconductor memory.

In the computer 1000 configured as described above, the CPU 1001 loads a program stored in the ROM 1002 or the storage unit 1008 into the RAM 1003 via the input and output interface 1005 and the bus 1004, and performs the program described above, so that the series of processes is performed.

The program performed by the computer 1000 (the CPU 1001) can be stored and provided on the removable storage medium 1011 as a package medium or the like, for example. In addition, the program can be provided via a wired or wireless transmission medium such as a local area network, the Internet, or digital satellite broadcasting.

In the computer 1000, by attaching the removable storage medium 1011 onto the drive 1010, the program can be installed in the storage unit 1008 via the input and output interface 1005. Further, the program can be received by the communication unit 1009 and installed in the storage unit 1008 via a wired or wireless transmission medium. Additionally, the program can be installed beforehand in the ROM 1002 or the storage unit 1008.

Here, in the present specification, the processes performed by the computer according to the program may not be necessarily performed in time-series order in the order described as the flowchart. That is, the processes performed by the computer according to the program also include processes performed in parallel or individually (for example, a parallel process or a process by an object). Further, the program may be processed by a single computer (processor), or may be processed in a distributed manner by a plurality of computers.

It is to be noted that the embodiments of the present technology are not limited to the above-described ones, and various changes can be made without departing from the gist of the present technology.

Further, each step of the series of processes described above can be performed by a single device or can be shared and performed by a plurality of devices. Furthermore, in a case where one step includes a plurality of processes, the plurality of processes included in the one step can be performed by a single device or shared by a plurality of devices.

It is to be noted that the present technology can have the following configurations.

(1)
A display control device including:
a voice receiver configured to receive a voice utterance from a user;
a communication unit configured to receive information for the voice utterance from a first server via a network; and
a controller configured to select an item corresponding to the voice utterance on the basis of the information that has been received, and configured to control an action in response to the item that has been selected,
in which the item includes a first item in an inside of a display screen and a second item that becomes displayable by scrolling, and
the controller selects either the first item or the second item on the basis of the information that has been received.

(2)
The display control device described in the above (1),
in which the second item includes an item that becomes displayable by reducing a size of the second item.

(3)
The display control device described in the above (1),
in which the second item includes an item that becomes displayable by enlarging an area for displaying the second item.

(4)
The display control device described in any of the above (1) to (3),
in which the controller includes the item in a menu displayed together with a content.

(5)
The display control device described in the above (4),
in which the controller includes, as the item, at least one first layer item included in a first layer and at least one second layer item included in a second layer.

(6)
The display control device described in the above (5),
in which in a case where a desired first layer item is selected from the first layer item included in the first layer, the controller displays the second layer including the at least one second layer item corresponding to the first later item that has been selected.

(7)
The display control device described in the above (5) or (6),
in which in a case where a desired first layer item is selected as a selection target from the first layer item included in the first layer, the controller
includes, as a next selection target, another first layer item included in the first layer and the at least one second layer item corresponding to the first layer item that is included in the second layer and that has been selected, and
includes, as the next selection target, no at least one second layer item corresponding to the first layer item that is unselected.

(8)
The display control device described in any of the above (5) to (7),
in which the first layer item includes a recommended read aloud item, and
in a case where the voice utterance has been made for a related item related to the recommended read aloud item, the controller regards that the voice utterance has been made for the recommended read aloud item related to the related item.

(9)

The display control device described in any of the above (5) to (8), in which a first direction in which the at least one first layer item displayed as the first layer is arranged and a second direction in which the at least one second layer item displayed as the second layer is arranged are orthogonal to each other.

(10)

The display control device described in any of the above (4) to (9), in which the controller includes a guide regarding a voice operation in response to the voice utterance in the menu.

(11)

The display control device described in the above (10), in which the controller displays the item to be identifiable for the user, and includes a display method of the item in the guide.

(12)

The display control device described in any of the above (4) to (11), in which in a case where a plurality of items that is same with the item in response to the voice utterance is present and a same item is also present in the inside of the display screen, the controller selects with priority an item that is present at a position closest to a reference position of the display screen in the inside of the display screen, and controls the action in response to the item that has been selected.

(13)

The display control device described in any of the above (4) to (12), in which in a case where a plurality of items that is same with the item in response to the voice utterance is present and a same item is present only in an outside of the display screen, the controller selects with priority an item that is present at a position closest to a reference position of the display screen in the outside of the display screen, and controls the action in response to the item that has been selected.

(14)

The display control device described in any of the above (4) to (13), in which the controller refers to a table for absorbing an erroneous conversion prepared beforehand, absorbs the erroneous conversion of a text in response to the voice utterance, and converts the text in which the erroneous conversion has been absorbed into a command.

(15)

The display control device described in the above (14), in which while the user is making the voice utterance or when the text is converted into the command, the controller refers to the table, and absorbs the erroneous conversion of the text.

(16)

The display control device described in any of the above (4) to (13), in which the communication unit transmits a text in response to the voice utterance to a second server that refers to a table for absorbing an erroneous conversion prepared beforehand and that corrects the erroneous conversion of the text in response to the voice utterance, and receives the text, in which the erroneous conversion has been corrected and which is transmitted from the second server, and the controller converts the text that has been received into a command.

(17)

The display control device described in any of the above (5) to (9), in which the menu includes a setting menu, the first layer item includes a setting item, and the second layer item includes a setting value.

(18)

A display control method by a display control device, the display control method including:

receiving a voice utterance from a user;

receiving information for the voice utterance from a server via a network; and selecting, as an item corresponding to the voice utterance on the basis of the information that has been received, either a first item in an inside of a display screen or a second item that becomes displayable by scrolling, and controlling an action in response to either the first item or the second item that has been selected.

(19)

A display control device including:

a voice receiver configured to receive a voice utterance from a user;

a communication unit configured to receive information for the voice utterance from a server via a network; and a controller configured to select an item corresponding to the voice utterance on the basis of the information that has been received, and configured to control an action in response to the item that has been selected, in which the item includes a first item in an inside of a display screen and a second item that becomes displayable by reducing a size of the item, and the controller selects either the first item or the second item on the basis of the information that has been received.

(20)

A display control device including:

a voice receiver configured to receive a voice utterance from a user;

a communication unit configured to receive information for the voice utterance from a server via a network; and a controller configured to select an item corresponding to the voice utterance on the basis of the information that has been received, and configured to control an action in response to the item that has been selected, in which the item includes a first item in an inside of a display screen and a second item that becomes displayable by enlarging an area in which the item is displayed, and the controller selects either the first item or the second item on the basis of the information that has been received.

REFERENCE SIGNS LIST 10, 10-1 to 10-N Display control device
11 Remote controller
20 Broadcast distribution system 30 Agent server
40 Text conversion server
50 Erroneous conversion correction and morpheme analysis server
60 Network
70 Agent support device
101 Controller
102 Signal input unit
103 Signal processing unit
104 Display unit
105 Speaker
106 Communication unit
107 Operation reception unit
108 Microphone
121 Voice input unit
122 Command processing unit
123 Command conversion unit
124 Erroneous conversion support unit
131 Erroneous conversion absorption unit
132 Morpheme analysis unit
301 Text conversion unit
302 Command conversion unit
401 Text conversion unit
501 Erroneous conversion support unit
511 Erroneous conversion correction unit
512 Morpheme analysis unit
1000 Computer
1001 CPU

The invention claimed is:

1. A display control device comprising:
voice receiver circuitry configured to receive a voice utterance from a user;
communication circuitry configured to receive information for the voice utterance from a first server via a network; and
controller circuitry configured to select an item corresponding to the voice utterance on a basis of the information that has been received, and configured to control an action in response to the item that has been selected,
wherein the item includes a first item that is displayed and viewable on a display screen and a second item that is not displayed, but becomes viewable and displayable by scrolling, and
wherein the controller circuitry is configured to scroll the second item such that it is displayed and viewable on a basis of the information that has been received.

2. The display control device according to claim 1, wherein the second item includes an item that becomes displayable by reducing a size of the second item.

3. The display control device according to claim 1, wherein the second item includes an item that becomes displayable by enlarging an area for displaying the second item.

4. The display control device according to claim 1,
wherein the controller circuitry is configured to display the item in a menu displayed together with a content.

5. The display control device according to claim 4, wherein the controller circuitry is configured to display, as the item, at least one first layer item included in a first layer and at least one second layer item included in a second layer.

6. The display control device according to claim 5,
wherein in a case where a desired first layer item is selected from the first layer item included in the first layer, the controller circuitry is configured to display the second layer including the at least one second layer item corresponding to the first later item that has been selected.

7. The display control device according to claim 5,
wherein in a case where a desired first layer item is selected as a selection target from the first layer item included in the first layer, the controller circuitry is configured to display, as a next selection target, another first layer item included in the first layer and the at least one second layer item corresponding to the first layer item that is included in the second layer and that has been selected, and includes, as the next selection target, no at least one second layer item corresponding to the first layer item that is unselected.

8. The display control device according to claim 5,
wherein the first layer item includes a recommended read aloud item, and
in a case where the voice utterance has been made for a related item related to the recommended read aloud item, the controller circuitry is configured to regard that the voice utterance has been made for the recommended read aloud item related to the related item.

9. The display control device according to claim 5, wherein a first direction in which the at least one first layer item displayed as the first layer is arranged and a second direction in which the at least one second layer item displayed as the second layer is arranged are orthogonal to each other.

10. The display control device according to claim 4,
wherein the controller circuitry is configured to provide a guide regarding a voice operation in response to the voice utterance in the menu.

11. The display control device according to claim 10,
wherein the controller circuitry is configured to display the item to be identifiable for the user, and includes a display method of the item in the guide.

12. The display control device according to claim 4,
wherein in a case where a plurality of items that is same with the item in response to the voice utterance is present and a same item is also present in the inside of the display screen, the controller circuitry is configured to select with priority an item that is present at a position closest to a reference position of the display screen in the inside of the display screen, and control the action in response to the item that has been selected.

13. The display control device according to claim 4,
wherein in a case where a plurality of items that is same with the item in response to the voice utterance is present and a same item is present only in an outside of the display screen, the controller circuitry is configured to select with priority an item that is present at a position closest to a reference position of the display screen in the outside of the display screen, and control the action in response to the item that has been selected.

14. The display control device according to claim 4,
wherein the controller circuitry is configured to refer to a table for absorbing an erroneous conversion prepared beforehand, absorb the erroneous conversion of a text in response to the voice utterance, and convert the text in which the erroneous conversion has been absorbed into a command.

15. The display control device according to claim 4,
wherein while the user is making the voice utterance or when the text is converted into the command, the controller circuitry is configured to refer to the table, and the erroneous conversion of the text.

16. The display control device according to claim 4, wherein the communications circuitry is configured to transmit a text in response to the voice utterance to a second server that refers to a table for absorbing an erroneous conversion prepared beforehand and that corrects the erroneous conversion of the text in response to the voice utterance, and receive the text, in which the erroneous conversion has been corrected and which is transmitted from the second server, and the controller circuitry is configured to convert the text that has been received into a command.

17. The display control device according to claim 5, wherein the menu includes a setting menu, the first layer item includes a setting item, and the second layer item includes a setting value.

18. A display control method by a display control device, the display control method comprising:
receiving a voice utterance from a user;
receiving information for the voice utterance from a server via a network; and
selecting, as an item corresponding to the voice utterance on a basis of the information that has been received, either a first item in an inside of a display screen or a second item that is not displayed, but becomes viewable and displayable by scrolling, and
scrolling the second item such that it is displayed and viewable on a basis of the information that has been received; and
controlling an action in response to either the first item or the second item that has been selected.

19. A display control device comprising:
voice receiving circuitry configured to receive a voice utterance from a user;
communication circuitry configured to receive information for the voice utterance from a server via a network; and
control circuitry configured to select an item corresponding to the voice utterance on a basis of the information that has been received, and configured to control an action in response to the item that has been selected,
wherein the item includes a first item that is displayed and viewable on a display screen and a second item that is not displayed becomes viewable and displayable by reducing a size of the item, and
the control circuitry is configured to select either the first item or the second item on a basis of the information that has been received.

20. A display control device comprising:
voice receiver circuitry configured to receive a voice utterance from a user;
communication circuitry configured to receive information for the voice utterance from a server via a network; and
controller circuitry configured to select an item corresponding to the voice utterance on a basis of the information that has been received, and configured to control an action in response to the item that has been selected,
wherein the item includes a first item a display screen and a second item that becomes displayable and viewable by enlarging an area in which the item is displayed, and
the controller circuitry is configured to select either the first item or the second item on a basis of the information that has been received.

21. The display control device according to claim 1, wherein the first item is not displayed or viewable when the second item becomes viewable.

22. The method according to claim 18, wherein the first item is not displayed or viewable when the second item becomes viewable.

* * * * *